(12) United States Patent
Lee et al.

(10) Patent No.: US 7,154,569 B2
(45) Date of Patent: *Dec. 26, 2006

(54) LIQUID CRYSTAL DISPLAY AND THIN FILM TRANSISTOR ARRAY PANEL THEREFOR

(75) Inventors: Baek-Woon Lee, Kyungki-do (KR); Hee-Seob Kim, Kyungki-do (KR); Sung-Kyu Hong, Kyungki-do (KR); Kyoung-Ju Shin, Kyungki-do (KR); Young-Chol Yang, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/506,410

(22) PCT Filed: Mar. 7, 2003

(86) PCT No.: PCT/KR03/00447

§ 371 (c)(1), (2), (4) Date: May 23, 2005

(87) PCT Pub. No.: WO03/075077

PCT Pub. Date: Sep. 12, 2003

(65) Prior Publication Data

US 2006/0164565 A1    Jul. 27, 2006

(30) Foreign Application Priority Data

Mar. 7, 2002    (KR) .................... 10-2002-0012121

(51) Int. Cl.
G02F 1/1368    (2006.01)
G02F 1/1343    (2006.01)
G02F 1/139    (2006.01)
G09G 3/36    (2006.01)

(52) U.S. Cl. .................. 349/48; 349/38; 349/129; 349/143; 345/92

(58) Field of Classification Search ................. 349/38, 349/43, 128, 129, 130, 139, 167, 177, 143, 349/48; 257/59, 72; 345/92
See application file for complete search history.

(56) References Cited

U.S. PATENT DOCUMENTS

| | | | |
|---|---|---|---|
| 6,078,367 A | 6/2000 | Satou | 349/46 |
| 6,335,771 B1 | 1/2002 | Hiraishi | 349/42 |
| 6,335,776 B1 | 1/2002 | Kim et al. | 349/129 |
| 6,936,845 B1* | 8/2005 | Kim et al. | 257/59 |
| 6,995,394 B1* | 2/2006 | Hong et al. | 257/59 |
| 2001/0024244 A1 | 9/2001 | Son | 349/43 |

* cited by examiner

Primary Examiner—Toan Ton
Assistant Examiner—Tai Duong
(74) Attorney, Agent, or Firm—Cantor Colburn LLP

(57) ABSTRACT

A thin film transistor array panel is provided, which includes: an insulating substrate (110); a plurality of control lines (121) provided on the substrate and including first and second control lines; a plurality of data lines (171) provided on the substrate and including first and second data lines; a pixel electrode (190) provided on the substrate and having a cutout (191); a field control electrode (178) provided on the substrate and overlapping the cutout; a first switching element for applying a first signal from the first data line to the pixel electrode in response to a first control signal from the first control line; and a second switching element (2) for controlling a second signal to be applied to the field control electrode (178).

27 Claims, 25 Drawing Sheets

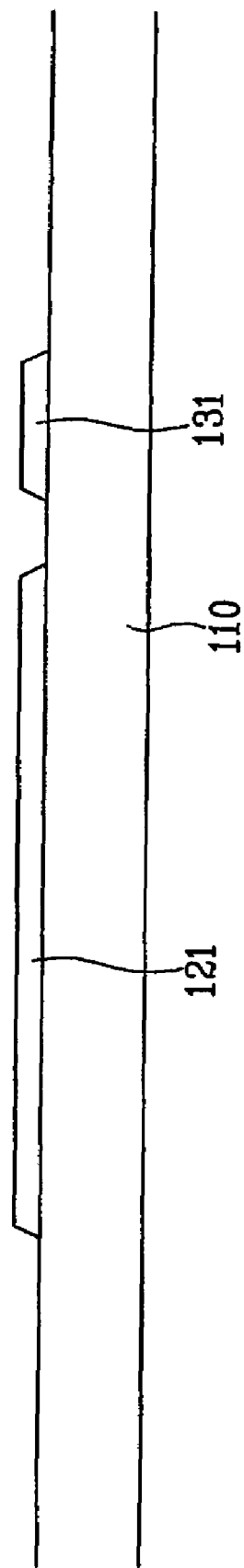

LIQUID CRYSTAL DISPLAY AND THIN FILM TRANSISTOR ARRAY PANEL THEREFOR

BACKGROUND OF THE INVENTION (a) Field of the Invention

The present invention relates to a liquid crystal display and a thin film transistor array panel therefor.

(b) Description of the Related Art

A typical liquid crystal display ("LCD") includes an upper panel provided with a common electrode and an array of color filters, a lower panel provided with a plurality of thin film transistors ("TFTs) and a plurality of pixel electrodes, and a liquid crystal layer interposed therebetween. The pixel electrodes and the common electrode are supplied with electric voltages and the voltage difference therebetween causes electric field. The variation of the electric field changes the orientations of liquid crystal molecules in the liquid crystal layer, and thus it changes the transmittance of light passing through the liquid crystal layer. As a result, the LCD displays desired images by adjusting the voltage difference between the pixel electrodes and the common electrode.

Since the LCD has a major disadvantage of its narrow viewing angle, several techniques for increasing the viewing angle have been developed. Among these techniques, the provision of cutouts or projections on the pixel electrodes and the common electrode opposite each other along with the vertical alignment of the liquid crystal molecules with respect to the panels is promising.

The cutouts provided both at the pixel electrodes and the common electrode give wide viewing angle by generating fringe field to adjust the tilt directions of the liquid crystal molecules.

The provision of the projections both on the pixel electrode and the common electrode distorts the electric field to adjust the tilt directions of the liquid crystal molecules.

The fringe field for adjusting the tilt directions of the liquid crystal molecules to form a plurality of domains is also obtained by providing the cutouts at the pixel electrodes on the lower panel and the projections on the common electrode on the upper panel.

Among these techniques for widening the viewing angle, the provision of the cutouts has problems that an additional photolithography step for patterning the common electrode is required, an overcoat is required for preventing the contamination of the liquid crystal material due to the pigments contained in the color filters, and severe disclination is generated near the edges of the patterned electrode. The provision of the projections also has a problem that the manufacturing method thereof is complicated since it requires an additional process step for forming the projections or a modification of a process step. Moreover, the aperture ratio is reduced due to the projections and the cutouts.

SUMMARY OF THE INVENTION

A thin film transistor array panel is provided, which includes: an insulating substrate; a plurality of control lines provided on the substrate and including first and second control lines; a plurality of data lines provided on the substrate and including first and second data lines; a pixel electrode provided on the substrate and having a cutout; a field control electrode provided on the substrate and overlapping the cutout; a first switching element for applying a first signal from the first data line to the pixel electrode in response to a first control signal from the first control line; and a second switching element for controlling a second signal to be applied to the field control electrode.

It is preferable that the first and the second switching elements are active at different times and the first switching element is active after the second switching element It is more preferable that the first switching element becomes active immediately after the activation of the first switching element.

The second signal may be supplied from one of the data lines and the second switching element applies the second signal to the field control electrode in response to a second control signal from the second control line.

The second signal is supplied from either the first data line or the second data line adjacent to the first data line.

The field control electrode preferably overlaps the pixel electrode.

The field control electrode and either the control lines or the data lines include substantially the same layer.

The thin film transistor array panel further includes an insulating layer interposed between the field control electrode and the pixel electrode and having a trench overlapping the cutout.

Preferably, the thin film transistor array panel further includes a semiconductor layer located under the data lines.

A liquid crystal display according to an embodiment of the present invention is provided, which includes: a first panel including a plurality of control lines including first and second control lines, a plurality of data lines including first and second data lines, a pixel electrode having a cutout, a field control electrode overlapping the cutout, a first switching element electrically connected to the first control line, the first data line and the pixel electrode, and an insulating layer interposed between the field control electrode and the pixel electrode; a second panel opposite the first panel and including a common electrode; and a liquid crystal layer interposed between the first and the second panels.

According to an embodiment of the present invention, $$V_{DCE} > V_p \times \left(1 + \frac{\varepsilon d'}{\varepsilon' d}\right)$$

for positive $V_p$ and $$V_{DCE} < V_p \times \left(1 + \frac{\varepsilon d'}{\varepsilon' d}\right)$$

for negative $V_p$ where $V_{DCE}$ is a voltage of the field control electrode with respect to the common electrode, $V_p$ is a voltage of the pixel electrode with respect to the common electrode, $\varepsilon$ and d are permittivity and thickness of the liquid crystal layer, respectively, and $\varepsilon'$ and d' are permittivity and thickness of the insulating layer.

According to another embodiment of the present invention, $$\frac{C_{LC}}{2C_{DCE} + C_{LC}} > \frac{\varepsilon d'}{\varepsilon' d}$$

where $C_{LC}$ is a capacitance between the pixel electrode and the common electrode, $C_{DCE}$ is a capacitance between the pixel electrode and the field control electrode, $\epsilon$ and d are permittivity and thickness of the liquid crystal layer, respectively, and $\epsilon'$ and $d'$ are permittivity and thickness of the insulating layer.

The liquid crystal display preferably further includes a second switching element for controlling a signal to be applied to the field control electrode.

It is preferable that the first and the second switching elements are active at different times and the first switching element is active after the second switching element. It is more preferable that the first switching element becomes active immediately after the activation of the first switching element.

The second switching element is preferably connected to the second control line, one of the data lines, and the field control electrode.

Preferably, the pixel electrode and the field control electrode are supplied with signals having the same polarity with respect to a voltage of the common electrode for a sequence of activation of the second switching element and the first switching element.

A liquid crystal display according to another embodiment of the present invention is provided, which includes: a first panel including a plurality of control lines including first and second control lines, a plurality of data lines including first and second data lines, a pixel electrode having a cutout, a field control electrode overlapping the cutout, a first switching element for applying a first signal from the first data line to the pixel electrode in response to a first control signal from the first control line, and a second switching element for controlling a second signal to be applied to the field control electrode; a second panel opposite the first panel and including a common electrode; and a liquid crystal layer interposed between the first and the second panels, wherein the second switching element is active before the first switching element in a sequence of activations of the second switching element and the first switching element and the first and the second signals have the same polarity with respect to a voltage of the common electrode for the sequence of activation.

Preferably, the first switching element becomes active immediately after the activation of the first switching element.

BRIEF DESCRIPTION OF THE DRAWINGS

The above and other advantages of the present invention will become more apparent by describing preferred embodiments thereof in detail with reference to the accompanying drawings in which:

FIGS. 11B, 13B and 14B are sectional views of the TFT array panel shown in FIGS. 11A, 13A and 14A, respectively;

DETAILED DESCRIPTION OF PREFERRED EMBODIMENTS

Figure 1A:
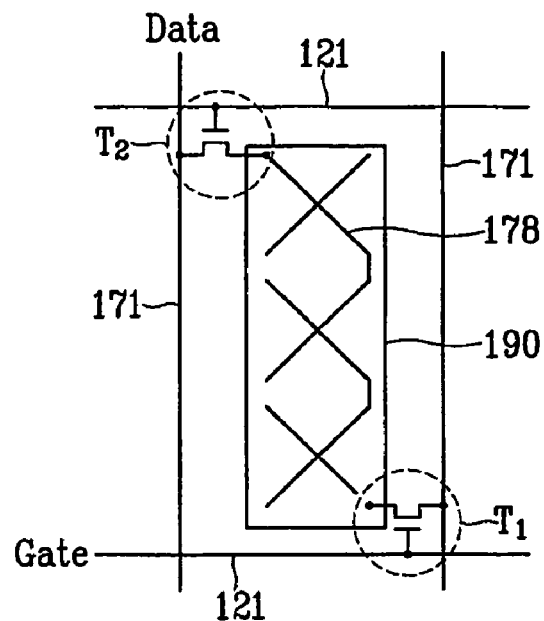
FIGS. 1A and 1B are schematic plan views of LCDs according to embodiments of the present invention.

The present invention now will be described more fully hereinafter with reference to the accompanying drawings, in which preferred embodiments of the inventions invention are shown. The present invention may, however, be embodied in many different forms and should not be construed as limited to the embodiments set forth herein.

In the drawings, the thickness of layers and regions are exaggerated for clarity. Like numerals refer to like elements throughout It will be understood that when an element such as a layer, region or substrate is referred to as being "on" another element, it can be directly on the other element or intervening elements may also be present. In contrast, when an element is referred to as being "directly on" another element, there are no intervening elements present.

Now, LCDs according to embodiments of this invention will be described in detail with reference to the accompanying drawings.

Figure 1B:
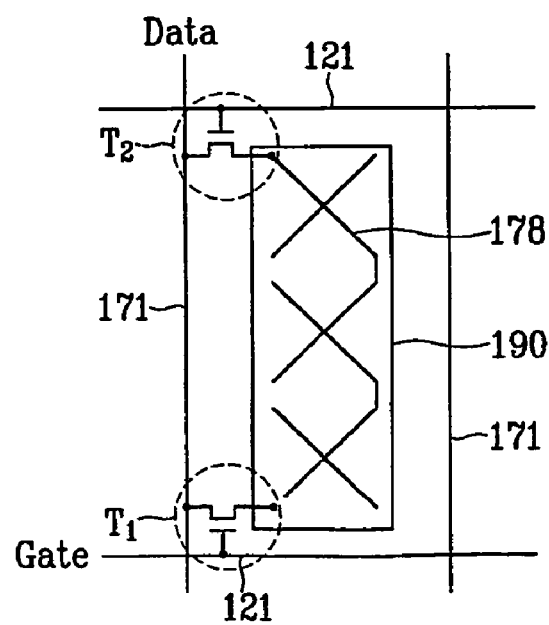
Figure 2:
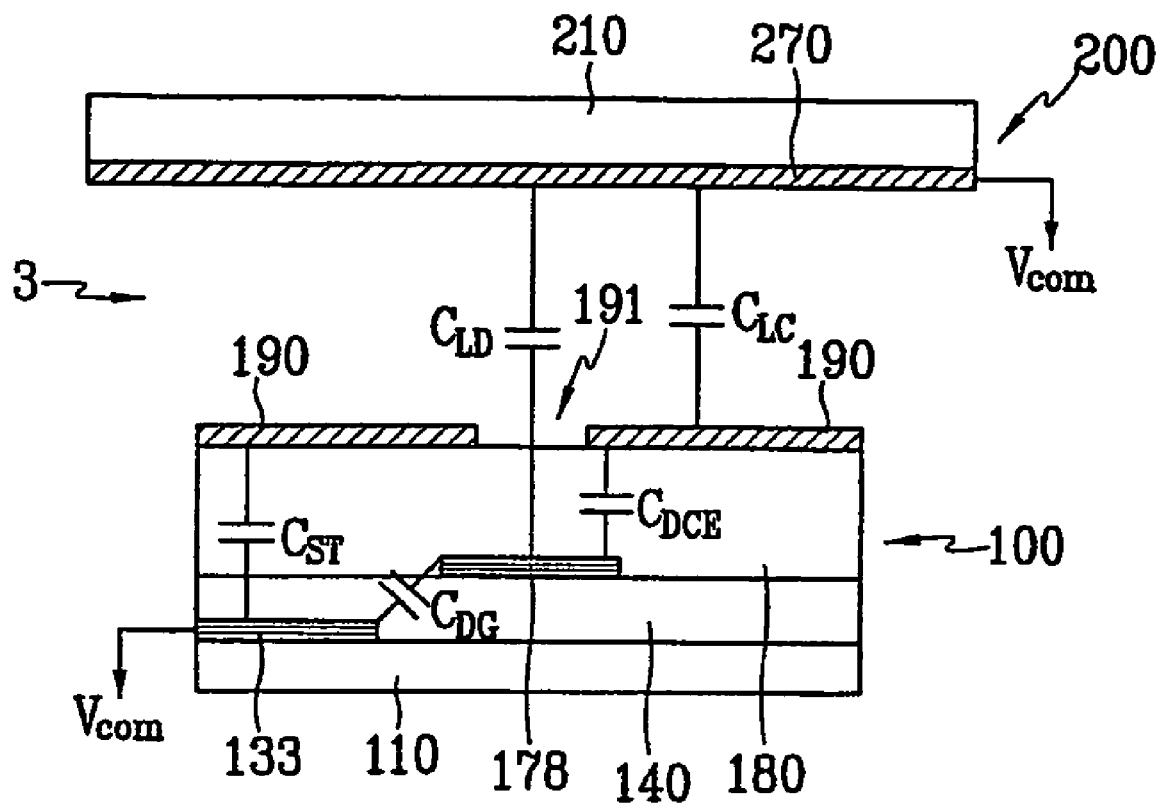
FIG. 2 is a schematic sectional view of an LCD according to an embodiment of the present invention.

FIGS. 1A and 1B are schematic plan views of LCDs according to embodiments of the present invention, and FIG. 2 is a schematic sectional view of an LCD according to an embodiment of the present invention, respectively.

An LCD according to an embodiment of the present invention includes a lower panel 100, an upper panel 200 facing the lower panel 100, and a liquid crystal layer 3 interposed between the lower panel 100 and the upper panel 200 and including a plurality of liquid crystal molecules aligned perpendicular to the surfaces of the panels 100 and 200.

A plurality of gate lines 121 and a plurality of data lines 171 are provided on a lower insulating substrate 110 of the lower panel 100. The gate lines 121 and the data lines 171 are insulated from each other via an insulator 140 and intersect each other. A pair of one of the gate lines 121 and one of the data lines 171 define a pixel.

A pair of a pixel electrode ("FE") 190 and a direction control electrode ("DCE") 178 insulated from each other via an insulator 180 are provided on the lower substrate 110. The DCE 178 includes substantially the same layer as the data lines 171 but it may include substantially the same layer as the gate lines 121. The PE 190 has a cutout 191, which overlaps the DCE 178. The PE 190 is connected to a pair of a gate line 121 and a data line 171 via a PE TFT $T_1$, while the DCE 178 is connected to another pair of a gate line 121 and a data line 171 via a DCE TFT $T_2$. The gate line 121 connected to the DCE TFT $T_2$ is previous to the gate line 121 connected to the PE TFT $T_1$. The data line 171 connected to the DCE TFT $T_2$ is previous to the data line 171 connected to the PE TFT $T_1$ as shown in FIG. 1A. Alternatively, a pair of the PE TFT $T_1$ and the DCE TFT $T_2$ are connected to the same data line 171 as shown in FIG. 1B. The PE TFT $T_1$ transmits the voltages from the associated data line 171 to the PE 190 in response to a voltage from the gate line 121 while the DCE TFT $T_2$ transmits the voltages from the associated data line 171 to the DCE 178 in response to a voltage from the previous gate line.

A storage electrode 133 is also provided on the lower substrate 110 and includes substantially the same layer as the gate lines 121. The storage electrode 133 is insulated from the gate lines 121, the data lines 171, the pixel electrode 190 and the DCE 178 via the insulators 140 and 180, and overlaps the pixel electrode 190.

A common electrode 270 is provided on an upper insulating substrate 210 of the upper panel 200, and supplied with a common voltage Vcom, which is also applied to the storage electrode 133.

The various conductors of the liquid crystal display shown in FIG. 2 form a plurality of capacitors. The pixel electrode 190 and the common electrode 270 form a liquid crystal capacitor $C_{LC}$, while the storage electrode 133 and the pixel electrode 190 form a storage capacitor $C_{ST}$ for enhancing the charge storing capacity of the liquid crystal capacitor $C_{LC}$. The direction control electrode 178 forms a DCE capacitor $C_{DCE}$ along with the pixel electrode 190, forms a capacitor $C_{LD}$ along with the common electrode 270, and forms a capacitor $C_{DG}$ along with the storage electrode 133.

The pixel electrode 190 and the common electrode 270 generate an electric field in the liquid crystal layer 3 interposed therebetween. The liquid crystal molecules in the liquid crystal layer 3 changes their orientations depending on the electric field to vary the transmittance of the light passing through the LCD. The electric field is curved near the cutout 191 to form so called a fringe field, which determines the inclination directions of the liquid crystal molecules upon application of the electric field. The DCE 178 and the common electrode 190 also generate an electric field for controlling the tilt directions of the liquid crystal molecules.

The operation of the LCD shown in FIGS. 1A, 1B and 2 are described in detail with reference to FIGS. 3A to 3C, which show both electric fields and equipotential lines respectively indicated by arrows and dotted lines. As described above, the liquid crystal molecules are vertically aligned to the panels 100 and 200 and tend to align perpendicular to electric field.

In the FIGS., $V_p$ is a voltage across the liquid crystal capacitor $C_{LC}$, i.e., the voltage applied to the pixel electrode 190 subtracted by the common electrode Vcom, while $V_{DCE}$ is the voltage applied to the DCE 190 subtracted by the common electrode Vcom. For convenience, it is assumed that the common electrode 270 is grounded, i.e., Vcom=0. Then, $V_p$ is considered to be the voltage applied to the pixel electrode 190, while $V_{DCE}$ is considered to be the voltage applied to the DCE 190. In addition, the permittivity and the thickness of the liquid crystal layer 3 are indicated by $\epsilon$ and d, respectively, while the permittivity and the thickness of the insulating layer 180 are indicated by $\epsilon'$ and d', respectively. Furthermore, the voltage $V_p$ applied to the pixel electrode 190 has a positive value.

Figure 3A:
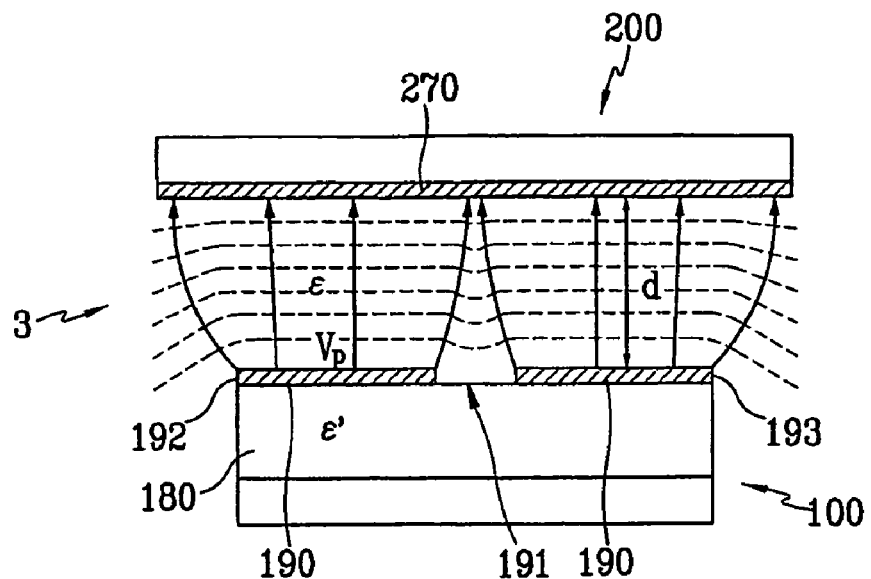
FIGS. 3A to 3C show electric fields and equipotential lines of an LCD according to an embodiment of the present invention.

As shown in FIG. 3A, an electric field in the liquid crystal layer 3 near edges 192 and 193 of the PE 190 and near the cutout 191 is distorted due to the geometry of the PE 190, when there is no DCE. In detail, the field near the edges 192 and 193 of the PE 190 and edges of the cutout 191 goes outwardly from the PE 190 to the common electrode 270. Consider liquid crystal molecules on the pixel electrode 190 in a region between the left edge 192 of the PE 190 and the left edge of the cutout 191, which is called a domain. The liquid crystal molecules near the left edge of the cutout 191 and the edge 192 of the PE 190 tilt opposite each other, and the tilt directions of the liquid crystal molecules in the domain gradually vary from the left edge of the cutout 191 to the left edge 192. Similarly, the tilt directions of the liquid crystal molecules in a domain between the right edge of the cutout 191 and the right edge 193 of the PE 190 gradually vary from the right edge of the cutout 191 to the right edge 193 of the PE 190.

Figure 3B:
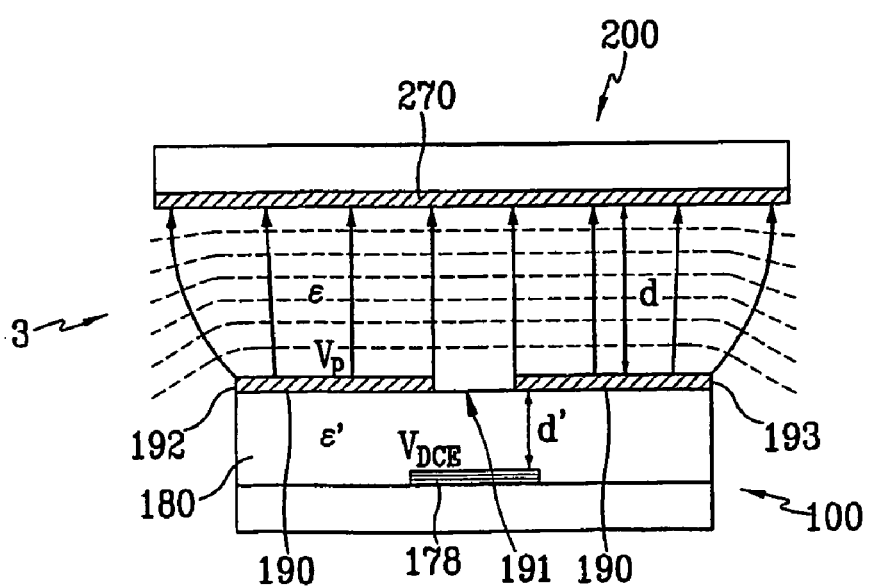

When the voltage $V_{DCE}$ applied to the DCE 178 is higher than the voltage $V_p$ applied to the PE 190 by a predetermined value, the field in the liquid crystal layer 3 near the edges of the cutout 191 is straight and perpendicular to the panels 100 and 200 as shown in FIG. 3B. For the voltage $V_p$ with a negative value, the DCE voltage $V_{DCE}$ should be lower than the pixel voltage $V_p$ by the predetermined value.

Figure 3C:
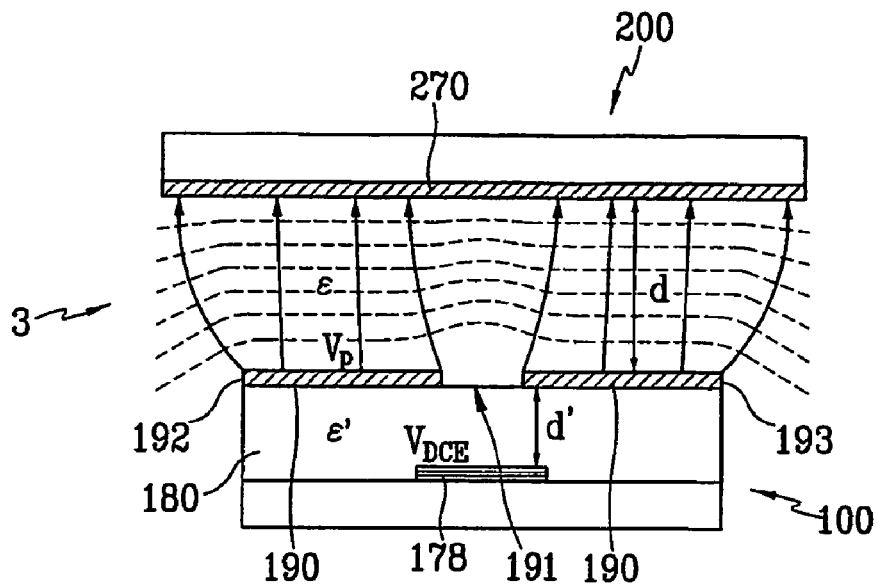

When the voltage $V_{DCE}$ applied to the DCE 178 is higher than the voltage $V_p$ applied to the PE 190 by a value larger than the above-described predetermined value, the field in the liquid crystal layer 3 near each edge 192 or 193 of the PE 190 and the corresponding edge of the cutout 191 is similar as shown in FIG. 3C. In detail, the field near the left edge 192 and near the left edge of the cutout 191 goes leftwards from the PE 190 to the common electrode 270. Similarly, the field near the right edge 193 and the right edge of the cutout 191 goes rightwards from the PE 190 to the common electrode 270. Accordingly, the liquid crystal molecules near each edge of the cutout 191 and the corresponding edges 192 or 193 of the PE 190 tilt in substantially the same direction, and the tilt directions of the liquid crystal molecules in each domain are uniform. For the voltage $V_p$ with a negative value, the DCE voltage $V_{DCE}$ should be lower than the pixel voltage $V_p$ by a value larger than the predetermined vale.

According to an embodiment of the present invention, the electric field in the liquid crystal layer 3 near the cutout 191 is straight and perpendicular to the panels 100 and 200 as shown in FIG. 3B when $$V_{DCE} = V_p \times \left(1 + \frac{\varepsilon d'}{\varepsilon' d}\right).$$

A uniform tilt direction of liquid crystal molecules in the domains, as shown in FIG. 3C, is obtained when $$V_{DCE} > V_p \times \left(1 + \frac{\varepsilon d'}{\varepsilon' d}\right)$$

for a positive pixel voltage $V_p$ and $$V_{DCE} < V_p \times \left(1 + \frac{\varepsilon d'}{\varepsilon' d}\right)$$

for a negative pixel voltage $V_p$. However, the voltage $V_{DCE}$ such that $$V_{DCE} < V_p \times \left(1 + \frac{\varepsilon d'}{\varepsilon' d}\right)$$

for a positive pixel voltage $V_p$ or $$V_{DCE} > V_p \times \left(1 + \frac{\varepsilon d'}{\varepsilon' d}\right)$$

for a negative pixel voltage $V_p$ gives a similar condition shown in FIG. 3A, which does not contribute to a uniform tilt direction of the liquid crystal molecules.

The above conclusion is obtained by assuming the common electrode 190 and the pixel electrode 190 as surface charge sources.

The pixel voltage $V_p$ and the DCE voltage $V_{DCE}$ are given by:

$$V_p = E_{LC} \times d = \frac{\sigma_0 A}{\varepsilon} \times d; \text{ and} \quad (1)$$

$$V_{DCE} = V_p + E_p \times d' = V_p + \frac{\sigma A}{\varepsilon'} d', \quad (2)$$

where $E_{LC}$ is the electric field in the liquid crystal layer 3, $E_p$ is the electric field in the insulating layer 180, $\sigma_0$ and $\sigma$ are the surface charge densities on the common electrode 270 and on the pixel electrode 190, respectively, and A is an area of the pixel electrode 190 or a corresponding area of the common electrode 270.

The distortion of the electric field in the liquid crystal layer 3 is due to the extra surface charges on the pixel electrode 190. Accordingly, the field distortion is prevented when there is no net surface charge on the pixel electrode 190. That is, the surface charge density $\sigma$ on the pixel electrode 190 is equal to $\sigma_0$. Since $$\sigma_0 A = V_p \frac{\varepsilon}{d}$$

from Equation (1), Equation (2) becomes $$V_{DCE} = V_p + \frac{\sigma_0 A}{\varepsilon'} d' = V_p + V_p \frac{\varepsilon d'}{\varepsilon' d} = V_p \left(1 + \frac{\varepsilon d'}{\varepsilon' d}\right). \quad (3)$$

As a result, the applicants concluded that the voltage $V_{DCE}$ applied to the DCE 178 is larger than the positive voltage $V_p$ applied to the pixel electrode 190 by a predetermined value for obtaining a uniform tilt direction of the liquid crystal molecules. On the contrary, the voltage $V_{DCE}$ applied to the DCE 178 is smaller than the negative voltage $V_p$ applied to the pixel electrode 190 by a predetermined value.

In addition, the applicants found that the voltage $V_{DCE}$ is larger than the DCE voltage $V_p$ when, in the LCD shown in FIGS. 1A and 1B, the DCE TFT $T_2$ is turned on earlier than the PE TFT $T_1$ and the polarity of the voltage $V_{DCE}$ and the DCE voltage $V_p$ are the same, which will be described in detail with reference to FIG. 4.

Figure 4:
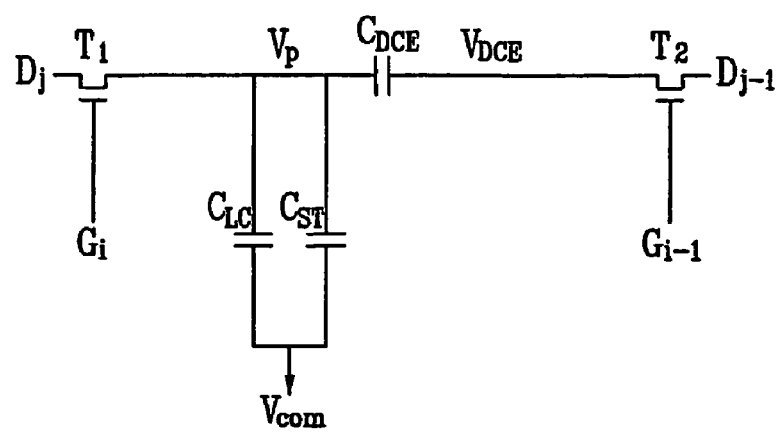
FIG. 4 is a schematic circuit diagram of an LCD shown in FIGS. 1A and 2.

FIG. 4 is a schematic circuit diagram of an LCD shown in FIGS. 1A and 2. In FIG. 4, the capacitors $C_{LD}$ and $C_{DG}$ in FIG. 2 are ignored since the capacitances of the capacitors $C_{LD}$ and $C_{DG}$ are very small, and the common voltage Vcom is zero.

Before application of a gate-on voltage to a previous gate line $G_{i-1}$, the PE TFT $T_1$ and the DCE TFT $T_2$ are in off states. Upon the application of the gate-on voltage to the previous gate line $G_{i-1}$, a positive data voltage is applied to the DCE 178. Then, the voltage $V_p$ of the PE 190 is changed, according to the voltage distribution between the capacitors $C_{DCE}$, $C_{LC}$ and $C_{ST}$ connected between the common electrode 270 and the DCE 178, to have a value lower than the voltage $V_{DCE}$ of the DCE 178. There after, the DCE TFT $T_2$ is turned off to make the DCE 178 floating. The floating of the DCE 178 makes the voltage across the DCE capacitor $C_{DCE}$ constant. Accordingly, the voltage $V_{DCE}$ of the floating DCE 178 is always larger than the voltage $V_p$ of the PE 190 irrespective of the voltage change of the PE 190. For example, if the PE voltage $V_p$ is increased when the pixel TFT $T_1$ is turned on, the DCE voltage $V_{DCE}$ follows the voltage rising of the PE voltage $V_p$ in order to maintain the voltage across the DCE capacitor $C_{DCE}$.

Similarly, the voltage $V_{DCE}$ of the floating DCE 178 is always smaller than the negative voltage $V_p$ of the PE 190 irrespective of the voltage change of the PE 190.

The applicants also found that the stable domains are obtained under the condition that $$\frac{C_{LC}}{2C_{DCE} + C_{LC}}|V_p + V_{j-1}| > \frac{\varepsilon d'}{\varepsilon' d}|V_p|, \quad (4)$$

or $$\frac{C_{LC}}{2C_{DCE} + C_{LC}} > \frac{\varepsilon d'}{\varepsilon' d}, \quad (5)$$

where $V_{j-1}$ is a data voltage to be applied upon turning on of the previous gate line, i.e., a data voltage to be applied to the DCE 178.

This result is obtained assuming that the capacitances $C_{LD}$ and $C_{DG}$ and the parasitic capacitances $C_{gd}$ between the gates and the drains of the TFTs $T_1$ and $T_2$ are ignorable compared with the capacitances $C_{DCE}$ and $C_{LC}$.

The voltage $V_p$ of the pixel electrode 190 and the voltage $V_{DCE}$ of the DCE 178 are given by $$V_p = V_j - \frac{C_{gd}}{C_{LC} + C_{LD} + 2C_{gd} - \frac{(C_{LD} + C_{gd})^2}{C_{DCE} + C_{LD} + C_{gd}}}(V_{on} - V_{off}) \approx V_j, \quad (6)$$

and

-continued $$V_{DCE} \approx V_p + \frac{C_{LC}}{2C_{DCE} + C_{LC}}(V_p + V_{j-1}), \quad (7)$$

where $V_j$ is the data voltage to be applied to the pixel electrode 190.

By substituting $V_{DCE}$ with Equation 7, the relation $$V_{DCE} > V_p \times \left(1 + \frac{\varepsilon d'}{\varepsilon' d}\right) \text{ (positive) or } V_{DCE} < V_p \times \left(1 + \frac{\varepsilon d'}{\varepsilon' d}\right) \text{ (negative)}$$

for obtaining stable domains becomes $$V_p + \frac{C_{LC}}{2C_{DCE} + C_{LC}}(V_p + V_{j-1}) > V_p + \frac{\varepsilon d'}{\varepsilon' d}V_p \text{ (positive), or} \quad (8)$$

$$V_p + \frac{C_{LC}}{2C_{DCE} + C_{LC}}(V_p + V_{j-1}) < V_p + \frac{\varepsilon d'}{\varepsilon' d}V_p \text{ (negative)}.$$

Subtraction of $V_p$ from both sides of Equation 8 yields $$\frac{C_{LC}}{2C_{DCE} + C_{LC}}(V_p + V_{j-1}) > \frac{\varepsilon d'}{\varepsilon' d}V_p \text{ (positive), or} \quad (9)$$

$$\frac{C_{LC}}{2C_{DCE} + C_{LC}}(V_p + V_{j-1}) < \frac{\varepsilon d'}{\varepsilon' d}V_p \text{ (negative)}.$$

Since $V_p$ and $V_{j-1}$ have the same polarity, Inequality (9) becomes $$\frac{C_{LC}}{2C_{DCE} + C_{LC}} > \frac{\varepsilon d'}{\varepsilon' d}, \text{ or} \quad (10)$$

$$\frac{1}{2\frac{C_{DCE}}{C_{LC}} + 1} > \frac{\varepsilon d'}{\varepsilon' d}.$$

Accordingly, stable domains are obtained by adjusting the ratio of the capacitances $C_{DCE}/C_{LC}$, the ratio of the permittivity $\varepsilon/\varepsilon'$ and the ratio of the distances $d'/d$.

Next, an LCD according to an embodiment of the present invention is described in detail with reference to FIGS. 5A and 5B.

Figure 5A:
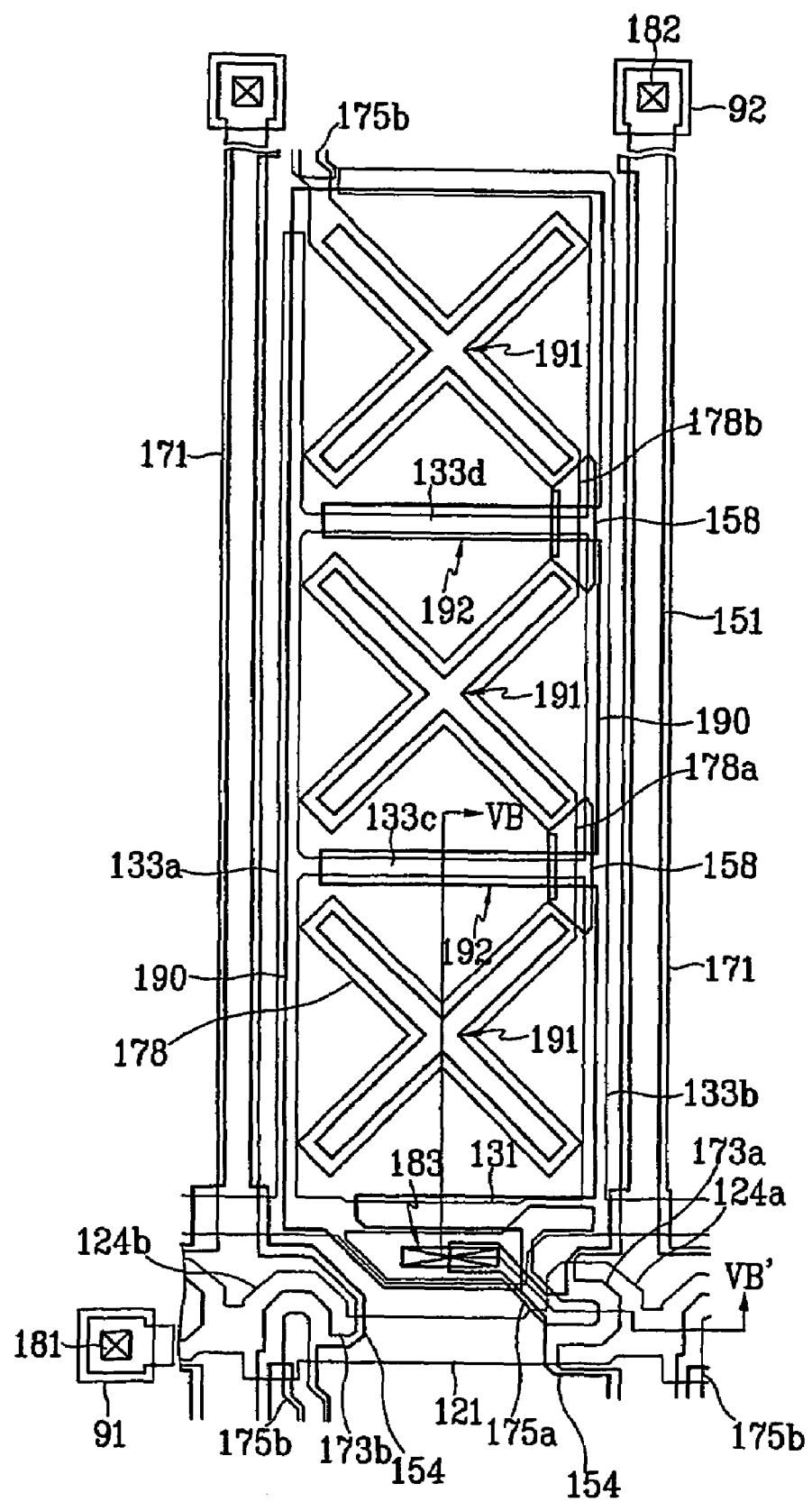
FIG. 5A is a layout view of an LCD according to an embodiment of the present invention.
Figure 5B:
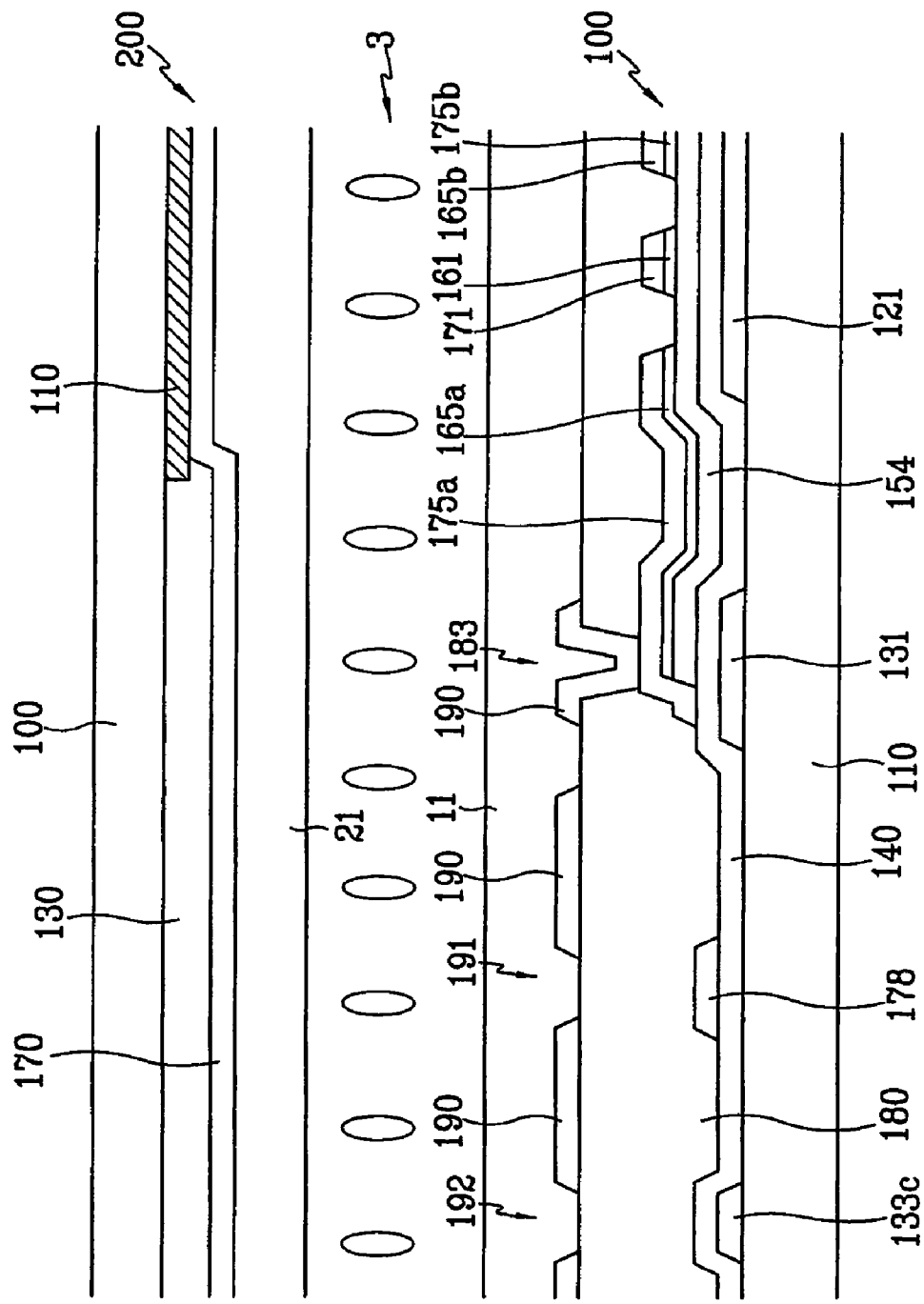
FIG. 5B is a sectional view of the LCD shown in FIG. 5A taken along the line VB–VB'.

FIG. 5A is a layout view of an LCD according to an embodiment of the present invention, and FIG. 5B is a sectional view of the LCD shown in FIG. 5A taken along the line VB–VB'.

An LCD according to an embodiment of the present invention includes a lower panel 100, an upper panel 200 facing the lower panel 100, and a liquid crystal layer 3 interposed between the lower panel 100 and the upper panel 200 and including a plurality of liquid crystal molecules aligned perpendicular to the surfaces of the panels 100 and 200.

A plurality of gate lines 121 and a plurality of storage electrodes 131 are formed on an insulating substrate 110. The gate lines 121 extend substantially in a transverse direction and substantially parallel to each other, and each gate line includes a plurality of pairs of expansions forming first and second gate electrodes 124a and 124b. The storage electrodes 131 extend substantially parallel to the gate lines 121 and each storage electrode 131 includes a stem and a plurality of sets of first to fourth branches 133a–133d forming a ladder shape. The first branch 133a extends from the stem in a longitudinal direction, and the second branch 133b includes a longitudinal portion connected to the stem and a transverse portion connected to an end of the longitudinal portion. The third and the fourth branches 133c and 133d extend in the transverse direction and connect the first branch 133a and the second branch 133b.

The gate lines 121 and the storage electrodes 131 are preferably made of Al, Cr or their alloys, Mo or Mo alloy. The gate lines 121 and the storage electrodes 131 preferably include a layer preferably made of Cr or Mo alloys having excellent physical and chemical characteristics and another layer preferably made of Al or Ag alloys having low resistivity. In addition, the lateral sides of the gate lines 121 are tapered, and the inclination angle of the lateral sides with respect to a horizontal surface ranges 30–80 degrees.

A gate insulating layer 140 is formed on the gate lines 121 and the storage electrodes 131.

A plurality of semiconductor stripes 151 and a plurality of semiconductor islands 158 preferably made of hydrogenated amorphous silicon ("a-Si") are formed on the gate insulating layer 140. Each semiconductor stripe 151 extends in the longitudinal direction and located between the first branch 133a and the second branch 133b belonging to adjacent sets of the branches 133a–133d of the storage electrode 131. Each semiconductor stripe 151 includes a plurality of expansions 154 disposed near the gate electrodes 124a and 124b, which form channels of TFTs. The semiconductor islands 158 are located near the intersections of the second branches 133b and the third and the fourth branches 133c and 133d of the storage electrode 131.

A plurality of sets of an ohmic contact stripe 161 and a plurality of pairs of ohmic contact islands 165a and 165b preferably made of silicide or hydrogenated a-Si heavily doped with n type impurity are formed on the semiconductor stripes 151. A plurality of ohmic contact islands (not shown) are also formed on the semiconductor islands 158.

The lateral sides of the semiconductor stripes and islands 151 and 158 and the ohmic contact stripes and islands 161, 165a and 165b are tapered, and the inclination angles thereof are in the range between 30–80 degrees.

A plurality of sets of a data line 171 and a plurality of pairs of first and second drain electrodes 175a and 175b are formed on the ohmic contact stripes 161, the ohmic contact islands 165a and 165b, and the gate insulating layer 140. The data lines 171 extend substantially in the longitudinal direction along the semiconductor stripes 151 and the ohmic contact stripes 161 and intersect the gate lines 121 and the storage electrodes 131. Each data line 171 includes a plurality of sets of pairs of expansions forming first and second source electrodes 173a and 173b and extending onto the expansions 154 of the semiconductor stripe 151. The first and the source electrodes 173a and 173b located opposite the first and the second drain electrodes 175a and 175b with respect to the gate electrodes 124a and 124b, respectively. The drain electrodes 175a and 175b extend from the expansions 154 to the stem of the storage electrode 131. The expansions 154 of the semiconductor stripe 151 completely covers the intersections of the gate lines 121 and the data lines 171 to ensure the insulation therebetween, and the semiconductor stripe 151 becomes wider near the intersections of the data line 171 and the storage electrodes 131 to have a width larger than that of the data lines, thereby ensuring the insulation therebetween, while most portions of the semiconductor stripe 131 are narrower that the data lines 171.

A plurality of DCEs 178 are formed on the gate insulting layer 140 and the ohmic contact islands on the semiconductor islands 158. Each DCE 178 includes a plurality of X-shaped pieces located between in areas surrounded by the storage electrode 131. The X-shaped pieces are connected in series near the semiconductor islands 158 through interconnections 178a and 178b, and the uppermost one of the X-shaped pieces is connected to the second drain electrode 175b. The interconnections 178a and 178b connecting the X-shaped pieces intersect the branches 133c and 133d of the storage electrode 131, and the semiconductor islands 158 and the ohmic contact islands thereon ensure the insulation between the interconnections 178a and 178b and the branches 133c and 133d.

The data lines 171, the drain electrodes 175a and 175b and the DCEs 178 are preferably made of Al, Cr or their alloys, Mo or Mo alloy. The data lines 171, the drain electrodes 175a and 175b and the DCEs 178 preferably include a layer preferably made of Cr or Mo alloys having excellent physical and chemical characteristics and another layer preferably made of Al or Ag alloys having low resistivity. The data lines 171, the drain electrodes 175a and 175b and the DCEs 178 have tapered lateral sides, and the inclination angles of the lateral sides ranges 30–80 degrees.

The ohmic contact stripes and islands 161, 165a and 165b are interposed only between the semiconductor stripes and islands 151 and 158 and the data lines 171, the drain electrodes 175a and 175b, and the DCEs 178 to reduce the contact resistance therebetween, and some portions of the semiconductor stripes and islands 151 and 158 are exposed out of the data lines 171, the drain electrodes 175a and 175b, and the DCEs 178.

The first gate electrode 124a, the first source electrode 173a and the first drain electrode 175a along with a portion of the semiconductor stripe 161 located between the first source electrode 173a and the first drain electrode 175a form a TFT for controlling a voltage to be applied to the pixel electrode 190, while the second gate electrode 124b, the second source electrode 173b and the second drain electrode 175b along with a portion of the semiconductor stripe 161 located between the second source electrode 173b and the second drain electrode 175b form a TFT for controlling a voltage to be applied to the DCE 178.

A passivation layer 180 preferably made of silicon nitride or organic insulator is formed on the data lines 171, the drain electrodes 175a and 175b and the DCEs 178 and the exposed portions of the semiconductor stripes and islands 151 and 158.

The passivation layer 180 is provided with a plurality of contact holes 183 exposing the first drain electrodes 175a and a plurality of contact holes 182 exposing end portions of the data lines 171. The gate insulating layer 140 and the passivation layer 180 are provided with a plurality of contact holes 181 exposing end portions of the gate lines 121. The contact holes 181 and 182 are provided for electrical connection with an external device, and can have various shapes such as polygon or circle. The area of each contact hole 181 or 182 is preferably equal to or larger than 0.5 mm×15 µm and not larger than 2 mm×60 µm.

A plurality of pixel electrodes 190 and a plurality of contact assistants 91 and 92 are formed on the passivation layer 180. The pixel electrodes 190 and the contact assistants 91 and 92 are preferably made of indium zinc oxide ("IZO") or indium tin oxide ("ITO").

Each pixel electrode 190 is connected to the first drain electrode 175a through the contact hole 183 and has a plurality of X-shaped cutouts 191 and a plurality of linear cutouts 192. The X-shaped cutouts 191 overlap the X-shaped portions of the DCE 178 to expose most portions of the DCE 178 while the linear cutouts 192 overlap the third and the fourth branches 133c and 133d of the storage electrode 131. Each pixel electrode 190 overlaps the DCE 178, which is connected to a previous gate line 121 and a previous data line 171 through a TFT, near the cutouts 191 to form a DCE capacitor $C_{DCE}$ while the pixel electrode 190 also overlaps the storage electrode 131 to form a storage capacitor $C_{ST}$.

The contact assistants 91 and 92 are connected to the exposed end portions of the gate lines 121 and the data lines 171 through the contact holes 181 and 182. The contact assistants 91 and 92 are optional, but are preferred to protect the exposed portions of the gate lines 121 and the data lines 171, respectively, and to complement the adhesiveness of the TFT array panel and driving ICs therefor.

An alignment layer 11 is coated on entire surface of the upper panel 100 except for areas provided with the contact assistants 91 and 92.

According to another embodiment of the present invention, a plurality of metal islands (not shown) preferably made of the same material as the gate lines 121 or the data lines 171 are provided near the end portions of the gate lines 121 and/or the data lines 171. The metal islands are connected to the contact assistants 91 or 92 via plurality of contact holes (not shown) provided at the passivation layer 180 and/or the gate insulating layer 140.

According to another embodiment of the present invention, the storage electrodes 131 are omitted and the pixel electrode 190 overlaps the gate line 121 to form a storage capacitor $C_{ST}$.

According to another embodiment of the present invention, the DCEs 178 include substantially the same layer as the gate lines 121.

Next, the upper panel 210 will now be described in detail.

A black matrix 220 for preventing light leakage and a plurality of red, green and blue color filters 230, which are alternately arranged, are formed on an upper substrate 210 preferably made of transparent insulating material such glass. A common electrode 270 preferably made of a transparent conductor such as ITO or IZO is formed on the black matrix 220 and the color filters 230, and an alignment layer 21 is coated on the common electrode 270.

The liquid crystal layer 3 has negative dielectric anisotropy and homeotropic alignment, where a plurality of liquid crystal molecules contained in the liquid crystal layer 3 are aligned such that their major axes are substantially perpendicular to the lower and the upper panels 100 and 200 in absence of electric field.

The lower panel 100 and the upper panel 200 are aligned and assembled such that the pixel electrodes 190 overlap the color filters 230 and the gate lines 121, the data lines 171 and the TFTs are covered with the black matrix 220. In this way, a plurality of domains partitioned by the cutouts 191 and 192 are obtained, which are stabilized by the DCEs 178.

A method of manufacturing the TFT array panel of the LCD shown in FIG. 5A and 5B according to an embodiment of the present invention is described with reference to FIGS. 6A to 9B as well as FIGS. 5A and 5B.

FIGS. 6A, 7A, 8A and 9A are layout views of a TFT array panel for an LCD shown in FIGS. 5A and 5B sequentially illustrating a manufacturing method thereof according to an embodiment of the present invention, and FIGS. 6B, 7B, 8B and 9B are sectional views of the TFT array panel shown in FIGS. 6A, 7A, 8A and 9A taken along the lines VIB–VIB', VIIB–VIIB', VIIIB–VIIIB' and IXB–IXV', respectively.

Figure 6A:
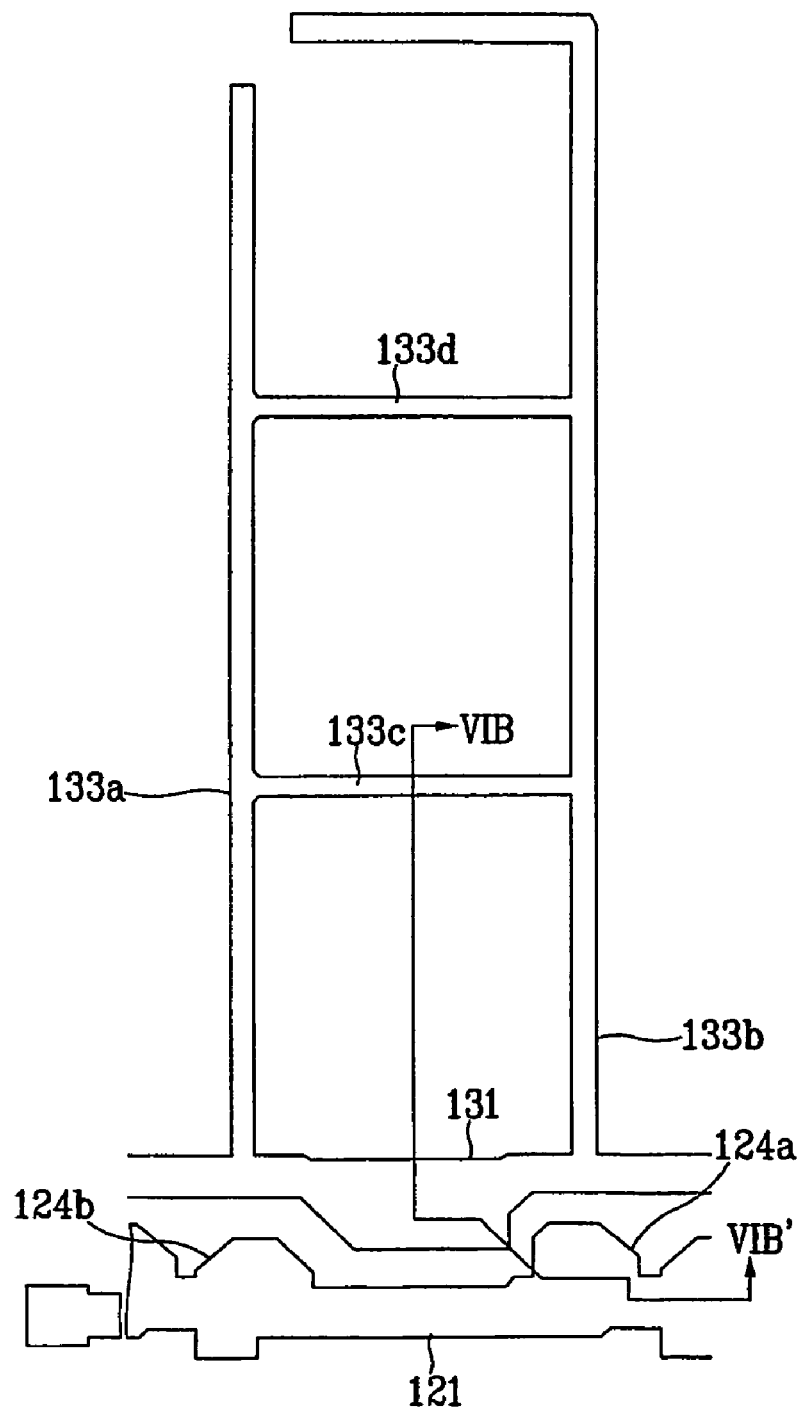
FIGS. 6A, 7A, 8A and 9A are layout views of a TFT array panel for an LCD shown in FIGS. 5A and 5B sequentially illustrating a manufacturing method thereof according to an embodiment of the present invention.
Figure 6B:
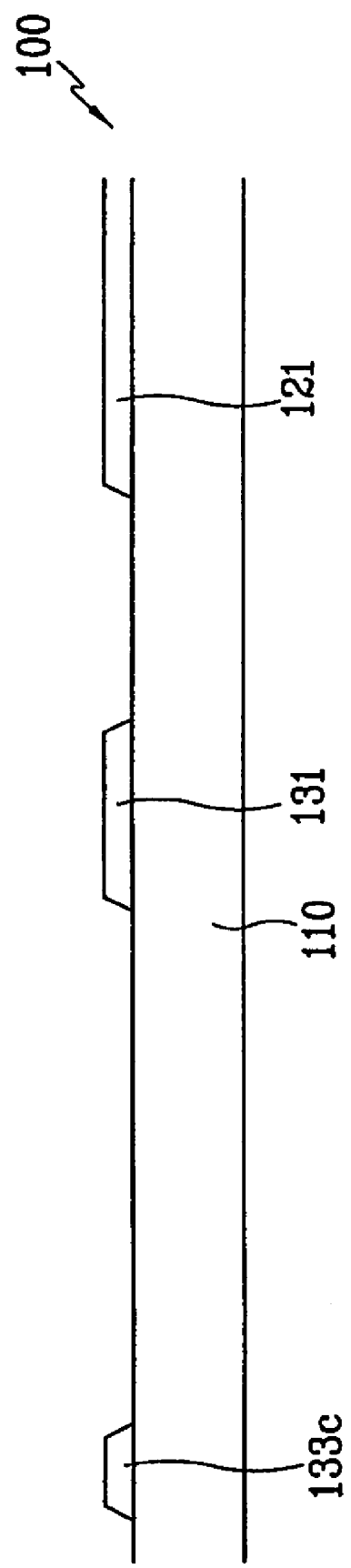
FIGS. 6B, 7B, 8B and 9B are sectional views of the TFT array panel shown in FIGS. 6A, 7A, 8A and 9A taken along the lines VIB–VIB', VIIB–VIIB', VIIIB–VIIIB' and IXB–IXV', respectively.

First, as shown in FIGS. 6A and 6B, a metal layer is sputtered on a substrate 10, and photo-etched to form a plurality of gate lines 131 and a plurality of storage electrodes 131.

Figure 7A:
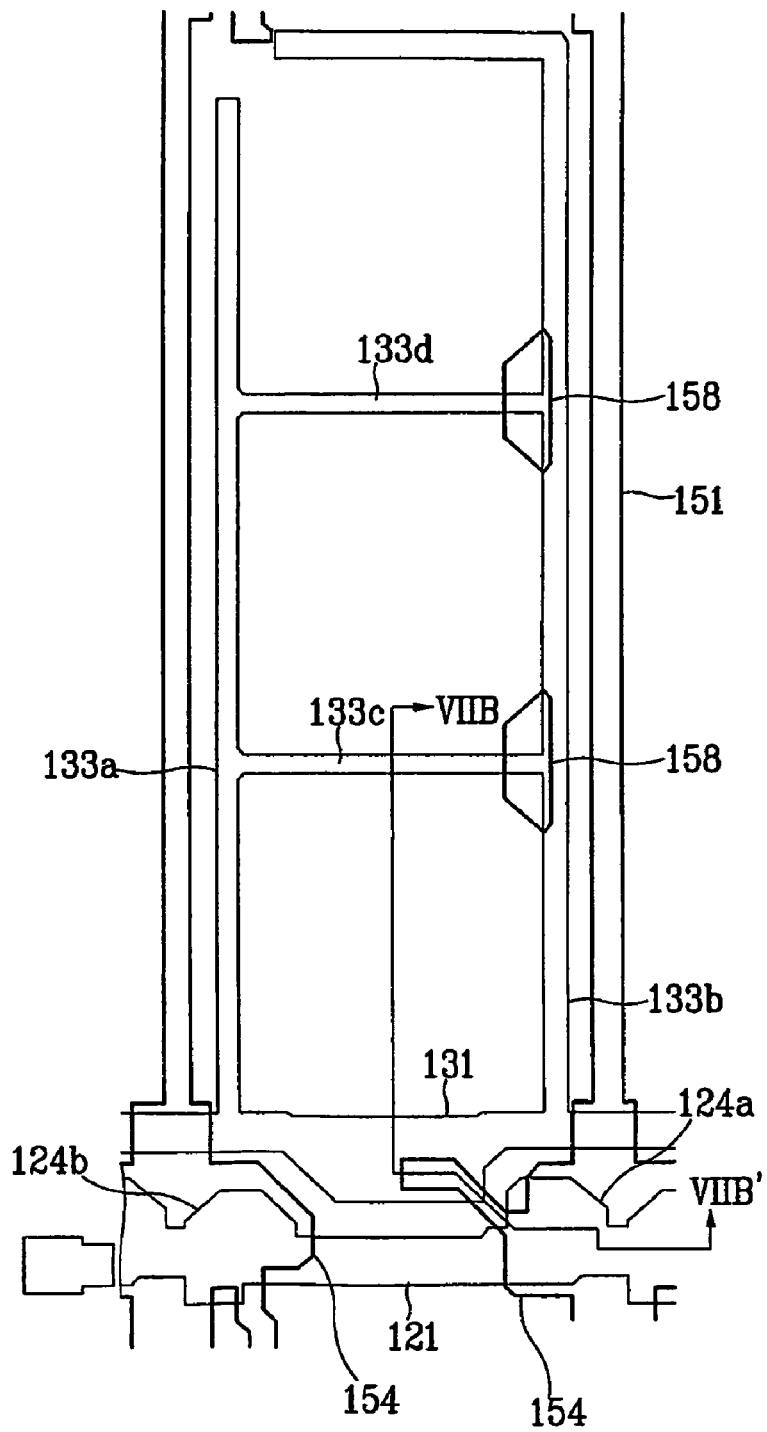
Figure 7B:
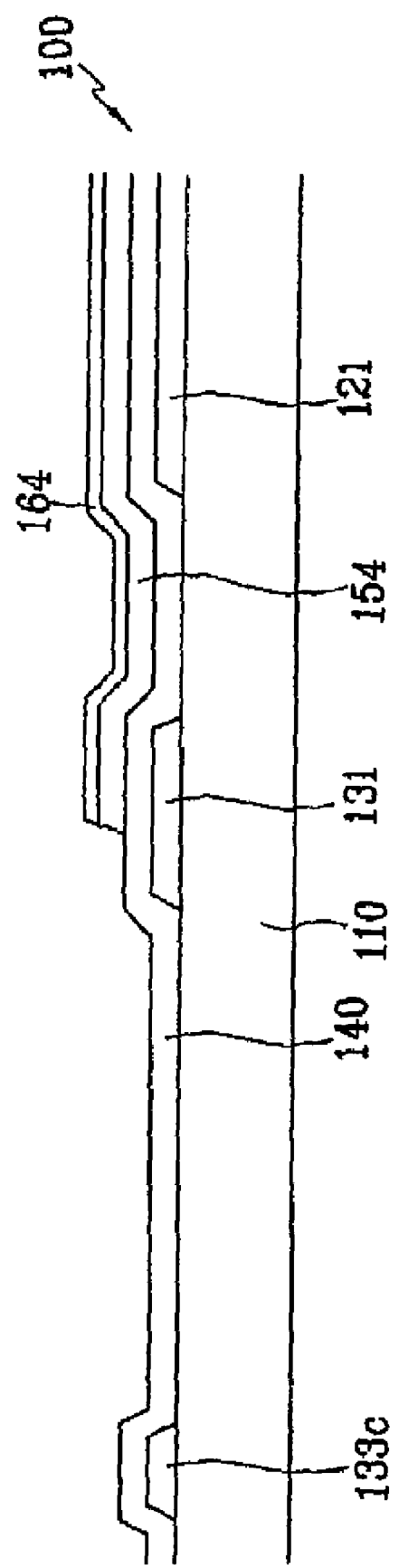

Next, a gate insulating layer 140 with 1,500–5,000 Å thickness, a hydrogenated a-Si layer with 500–2,000 Å thickness, and a doped hydrogenated a-Si layer with 300–600 Å thickness are sequentially deposited by such as chemical vapor deposition ("CVD"). After the deposition of the triple layers, the upper two layers, i.e., the doped a-Si layer and the a-Si layer are photo-etched using a photoresist pattern to form a plurality of doped a-Si stripes 164 and a plurality of semiconductor stripes and islands 151 and 158, as shown in FIGS. 7A and 7B. In this step, a plurality of doped a-Si islands (not shown) are also formed on the semiconductor islands 158.

Figure 8A:
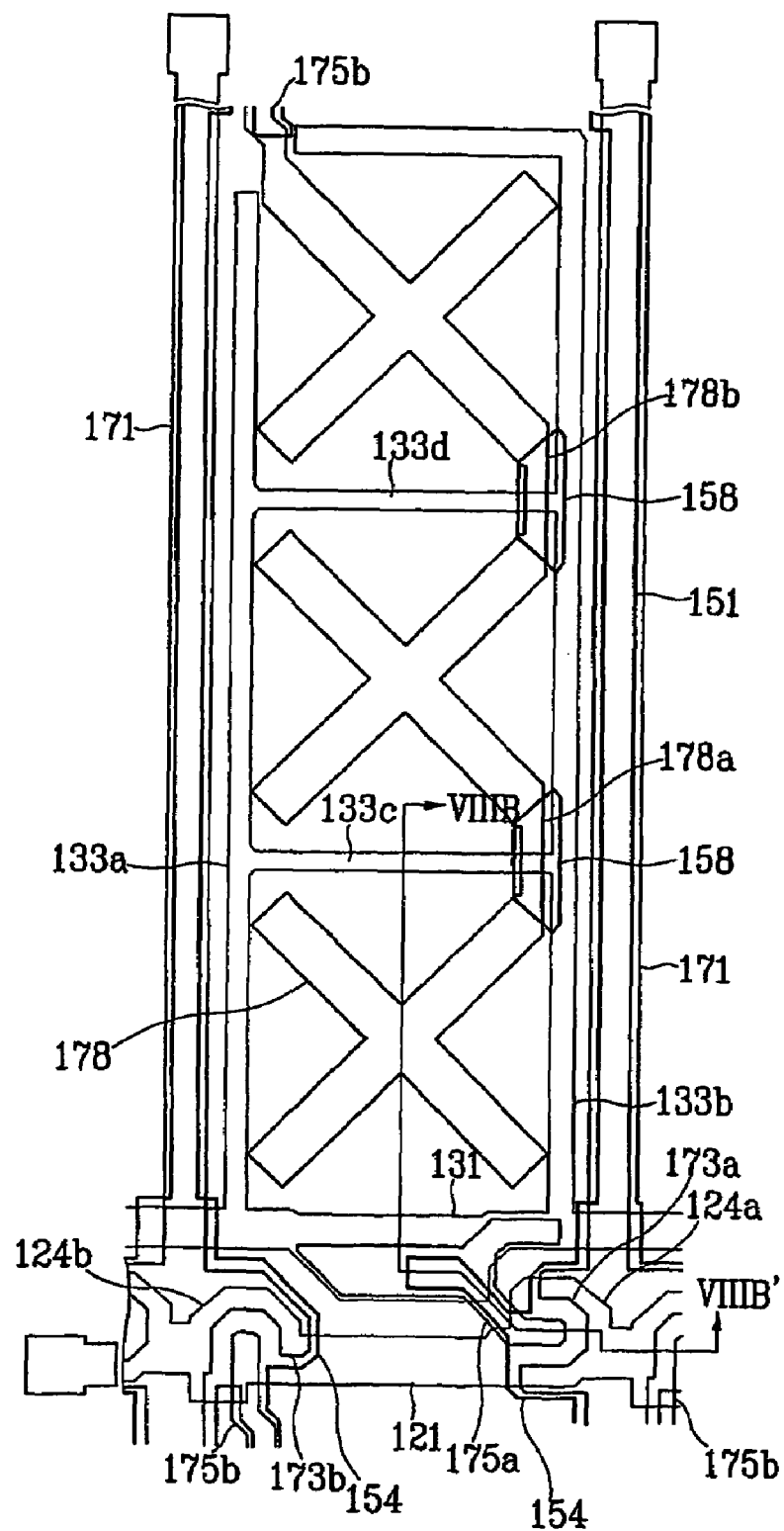
Figure 8B:
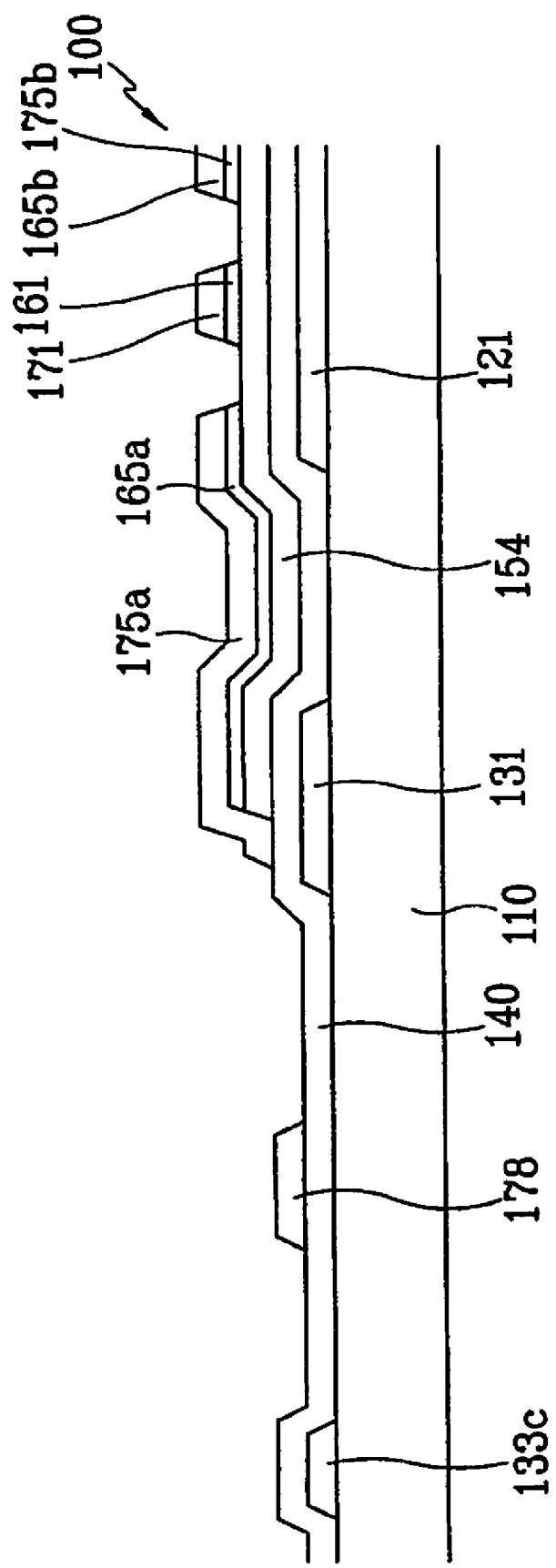

As shown in FIGS. 8A and 8B, a metal layer with 1,500–3,000 Å thickness is sputtered and photo-etched to form a plurality of data lines 171, a plurality of drain electrodes 175*a* and 175*b* and a plurality of DCEs 178. Then, portions of the doped a-Si stripes 164, which are not covered by the data lines 171 and the drain electrodes 175*a* and 175*b*, are removed to separate a plurality of ohmic contact stripes 161 and a plurality of ohmic contact islands 165*a* and 165*b* therefrom and to expose portions of the semiconductor layer 151 between the data lines 171 and the drain electrodes 175*a* and 175*b*. Portions of the doped a-Si islands on the semiconductor islands 178, which are not covered with the DCEs 178, are also removed in this step.

Figure 9A:
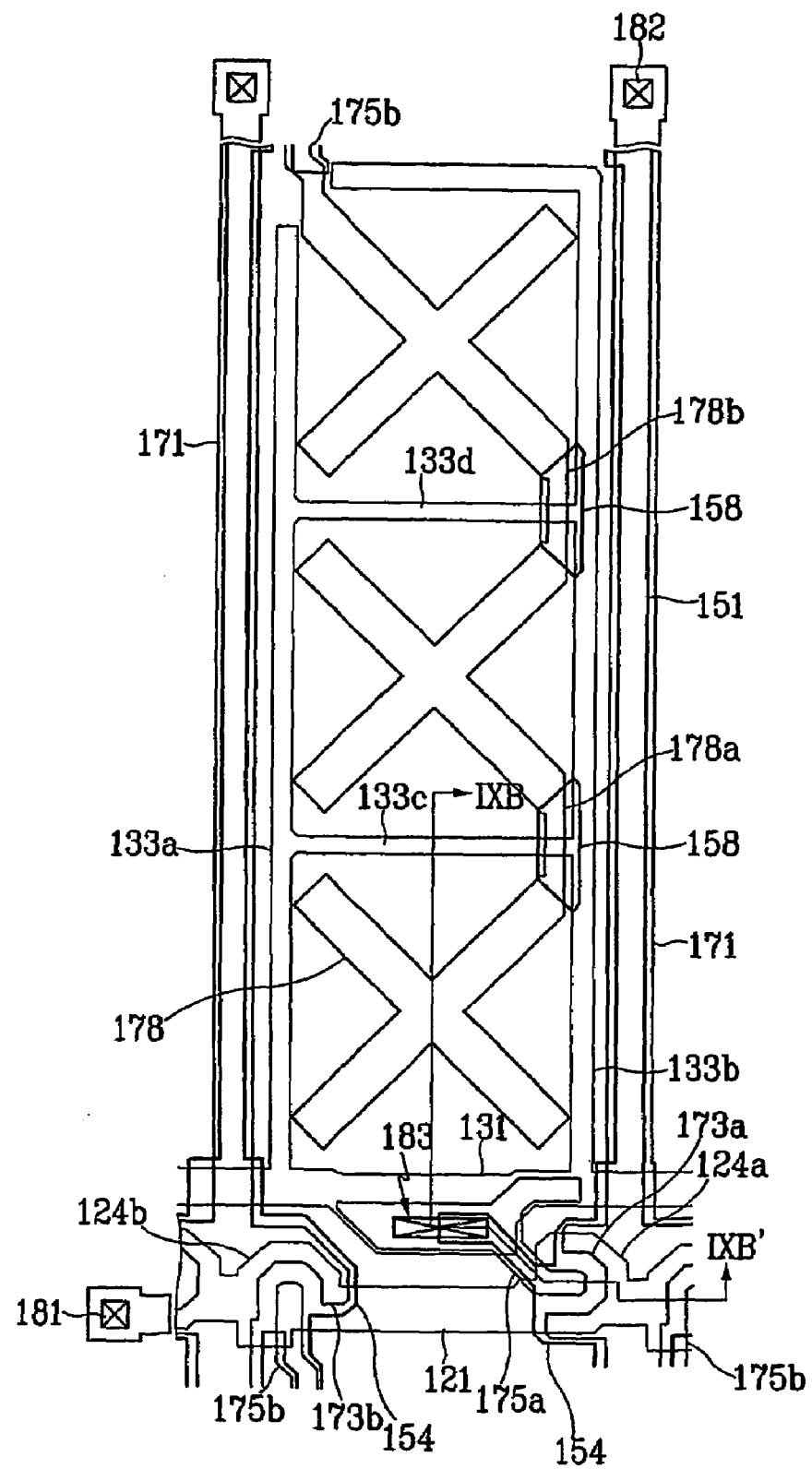
Figure 9B:
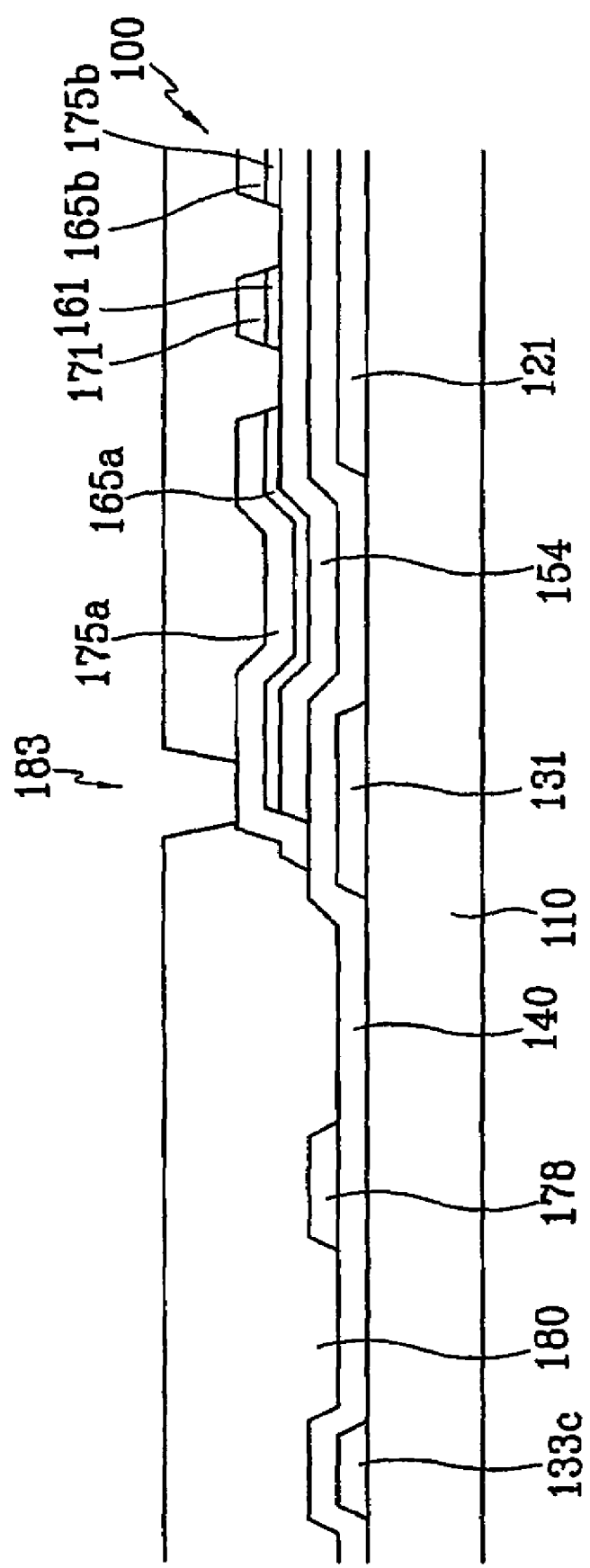

Subsequently, a passivation layer 180 is formed by coating an organic insulating material having low dielectric constant and good planarization characteristic or by CVD of low dielectric insulating material such as SiOF or SiOC having a dielectric constant equal to or less than 4.0. Thereafter, the passivation layer 180 and the gate insulating layer 140 are photo-etched using a photoresist pattern to form a plurality of contact holes 181, 182 and 183, as shown in FIGS. 9A and 9B.

As shown in FIGS. 6A and 6B, an ITO layer or an IZO layer with thickness of 1,500–500 Å is deposited and photo-etched using a photoresist pattern to form a plurality of pixel electrodes 190 and a plurality of contact assistants 91 and 92, and finally, an alignment layer 11 is coated on the substrate 110.

A TFT array panel for an LCD according to another embodiment of the present invention is described in detail with reference to FIGS. 10A and 10B.

Figure 10A:
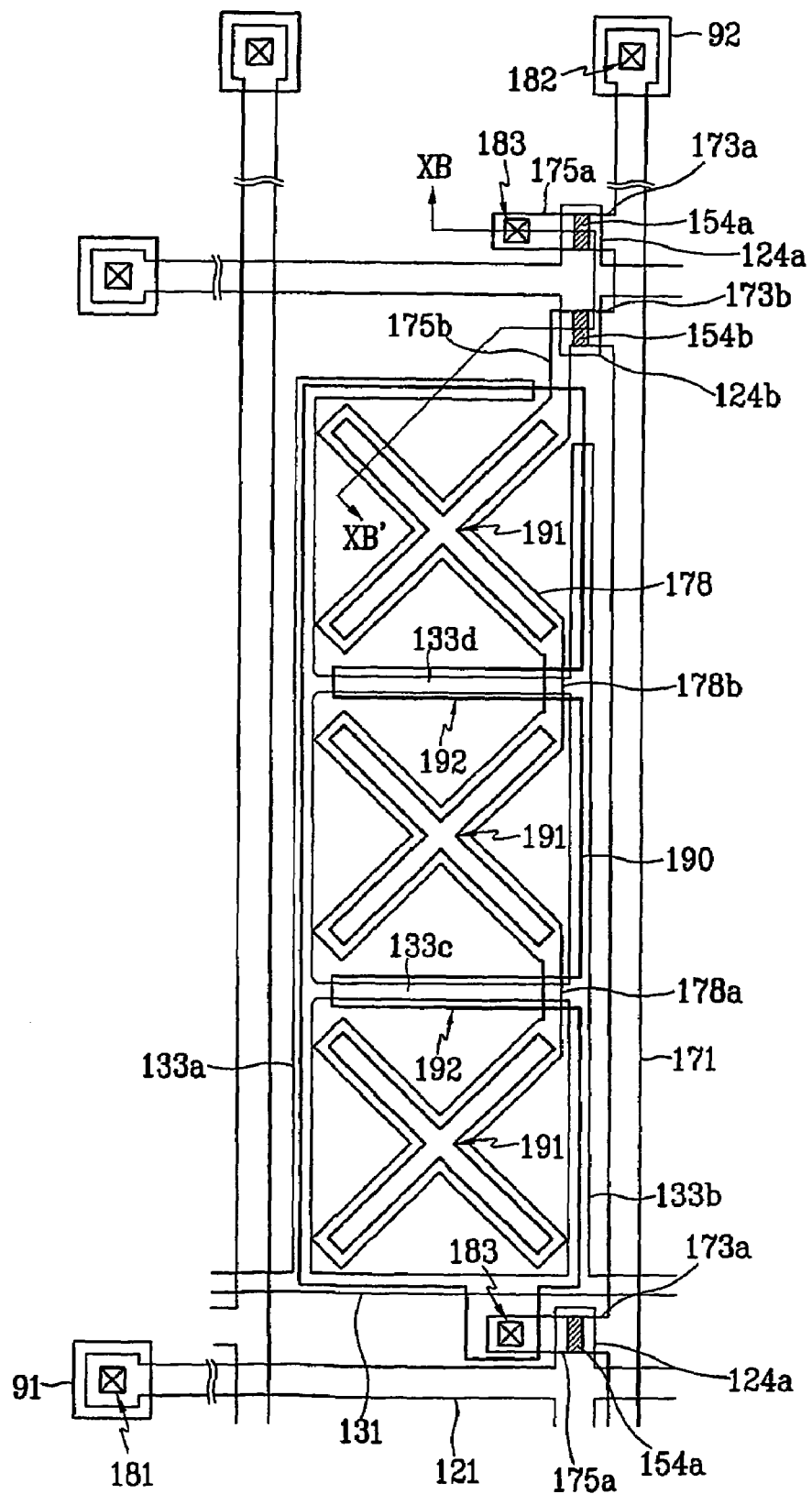
FIG. 10A is a layout view of a TFT array panel according to another embodiment of the present invention.
Figure 10B:
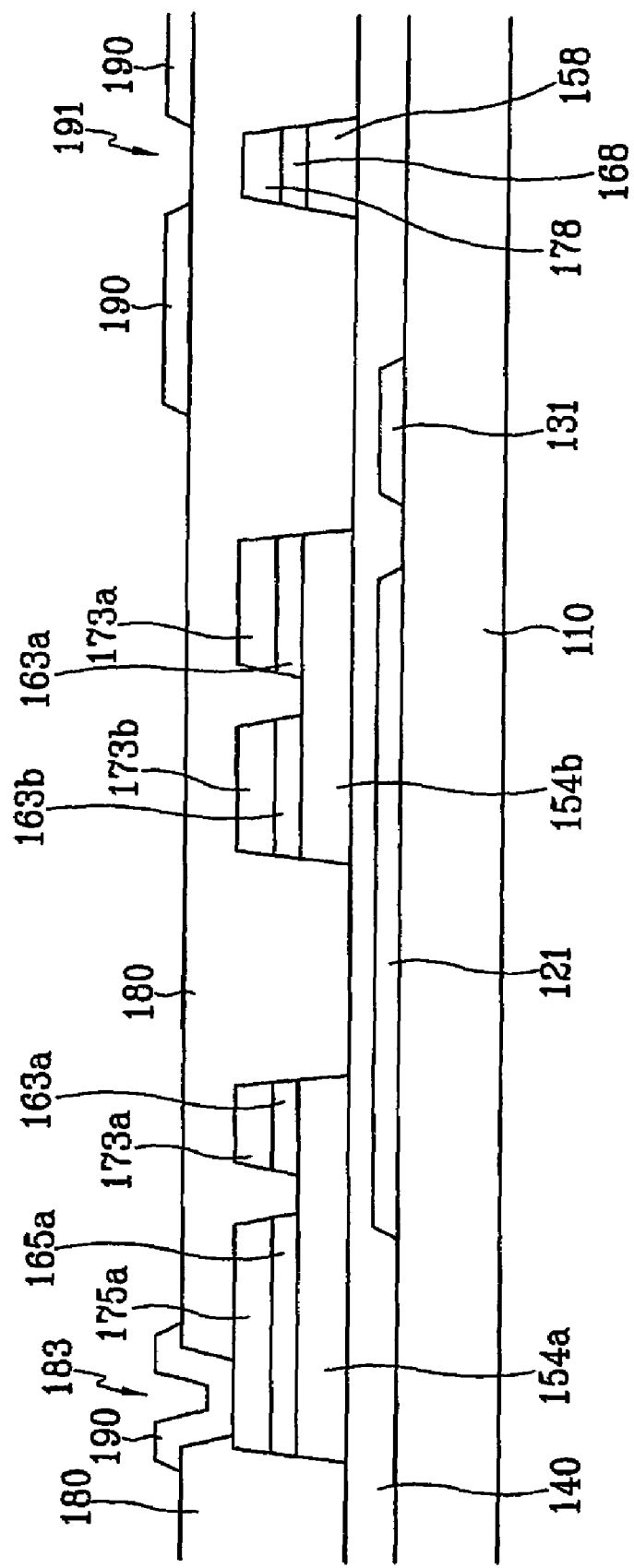
FIG. 10B is a sectional view of the TFT array panel shown in FIG. 10A taken along the line XB–XB'.

FIG. 10A is a layout view of a TFT array panel according to another embodiment of the present invention, and FIG. 10B is a sectional view of the TFT array panel shown in FIG. 10A taken along the line XB–XB'.

A plurality of gate lines 121 and a plurality of storage electrodes 131 are formed on an insulating substrate 110. Each gate line includes a plurality of pairs of expansions forming first and second gate electrodes 124*a* and 124*b*. Each storage electrode 131 includes a stem and a plurality of sets of first to fourth branches 133*a*–133*d* forming a ladder shape. The first branch 133*a* includes a longitudinal portion connected to the stem and a transverse portion connected to an end of the longitudinal portion, and the second branch 133*b* extends from the stem in a longitudinal direction The third and the fourth branches 133*c* and 133*d* extend in the transverse direction and connect the first branch 133*a* and the second branch 133*b*.

A gate insulating layer 140 is formed on the gate lines 121 and the storage electrodes 131.

A plurality of semiconductor stripes 151 preferably made of hydrogenated a-Si are formed on the gate insulating layer 140. Each semiconductor stripe 151 includes a plurality of sets of three branches 154*a*, 154*b* and 158. The branches 154*a* and 154*b* in each set are disposed near the respective gate electrodes 124*a* and 124*b* to form channels of TFTs, and the branch 158 is connected to the branch 154*b* and includes three X-shaped portions and two interconnections respectively connecting adjacent X-shaped portions. Each of the X-shaped portions of the branch 158 is located in an area confined by the storage electrode 131 and the interconnections of the branch 158 are located near the intersections of the second branches 133*b* and the third and the fourth branches 133*c* and 133*d* of the storage electrode 131.

A plurality of sets of an ohmic contact stripe 161 and a plurality of pairs of ohmic contact islands 165*a* and 165*b* preferably made of silicide or hydrogenated a-Si heavily doped with n type impurity are formed on the semiconductor stripes 151. The ohmic contact island 165*a* is located on the branch 154*a* of the semiconductor stripe 151, while ohmic contact island 165*b* is located on the branches 154*b* and 158 of the semiconductor stripe 151. A portion of the ohmic contact island 165*b* located on the branch 158 of the semiconductor stripe 151 is represented by reference numeral 168.

A plurality of data lines 171, a plurality of pairs of first and second drain electrodes 175*a* and 175*b*, and a plurality of DCEs 178 connected to the second drain electrodes 175*b* are formed on the ohmic contact stripes 161 and the ohmic contact islands 165*a* and 165*b*. Each data line 171 includes a plurality of sets of pairs of expansions forming first and second source electrodes 173*a* and 173*b* and extending onto the expansions 154 of the semiconductor stripe 151.

The data lines 171 have substantially the same planar shape as the ohmic contact stripes 161, the first drain electrodes 175*a* have substantially the same planar shape as the ohmic contact islands 165*a*, and the second drain electrodes 175*b* and the DCE 178 have substantially the same planar shape as the ohmic contact islands 165*b* and 168. The semiconductor stripes 151 have substantially the same planar shape as the data lines 171, the drain electrodes 175*a* and 175*b* and the DCEs 178 except for channel portions located between the data lines 171 and the drain electrodes 175*a* and 175*b*.

Accordingly, each DCE 178 includes a plurality of X-shaped pieces and a plurality of interconnections located on the X-shaped portions and the interconnections of the branch 158 of the semiconductor stripe 151, respectively.

The first gate electrode 124*a*, the first source electrode 173*a* and the first drain electrode 175*a* along with the first branch 154*a* of the semiconductor stripe 161 located between the first source electrode 173*a* and the first drain electrode 175*a* form a TFT for controlling a voltage to be applied to the pixel electrode 190, while the second gate electrode 124*b*, the second source electrode 173*b* and the second drain electrode 175*b* along with the second branch 154*b* of the semiconductor stripe 161 located between the second source electrode 173*b* and the second drain electrode 175*b* form a TFT for controlling a voltage to be applied to the DCE 178.

A passivation layer 180 preferably made of silicon nitride or organic insulator is formed on the data lines 171, the drain electrodes 175*a* and 175*b* and the DCEs 178 and the exposed portions of the semiconductor stripes 151.

The passivation layer 180 is provided with a plurality of contact holes 183 exposing the first drain electrodes 175a and a plurality of contact holes 182 exposing end portions of the data lines 171. The gate insulating layer 140 and the passivation layer 180 are provided with a plurality of contact holes 181 exposing end portions of the gate lines 121.

A plurality of pixel electrodes 190 and a plurality of contact assistants 91 and 92 are formed on the passivation layer 180.

Each pixel electrode 190 is connected to the first drain electrode 175a through the contact hole 183 and has a plurality of X-shaped cutouts 191 and a plurality of linear cutouts 192. The X-shaped cutouts 191 overlap the X-shaped portions of the DCE 178 to expose most portions of the DCE 178 while the linear cutouts 192 overlap the third and the fourth branches 133c and 133d of the storage electrode 131. Each pixel electrode 190 overlaps the DCE 178, which is connected to a previous gate line 121 but to the same data line 171 through a TFT, near the cutouts 191 to form a DCE capacitor $C_{DCE}$, while the pixel electrode 190 also overlaps the storage electrode 131 to form a storage capacitor $C_{ST}$.

The contact assistants 91 and 92 are connected to the exposed end portions of the gate lines 121 and the data lines 171 through the contact holes 181 and 182.

An alignment layer 11 is coated on entire surface of the upper panel 100 except for areas provided with the contact assistants 91 and 92.

Now, a method of manufacturing the TFT array panel shown in FIGS. 10A and 10B are described in detail with reference to FIGS. 11A to 14B as well as FIGS. 10A and 10B.

Figure 11A:
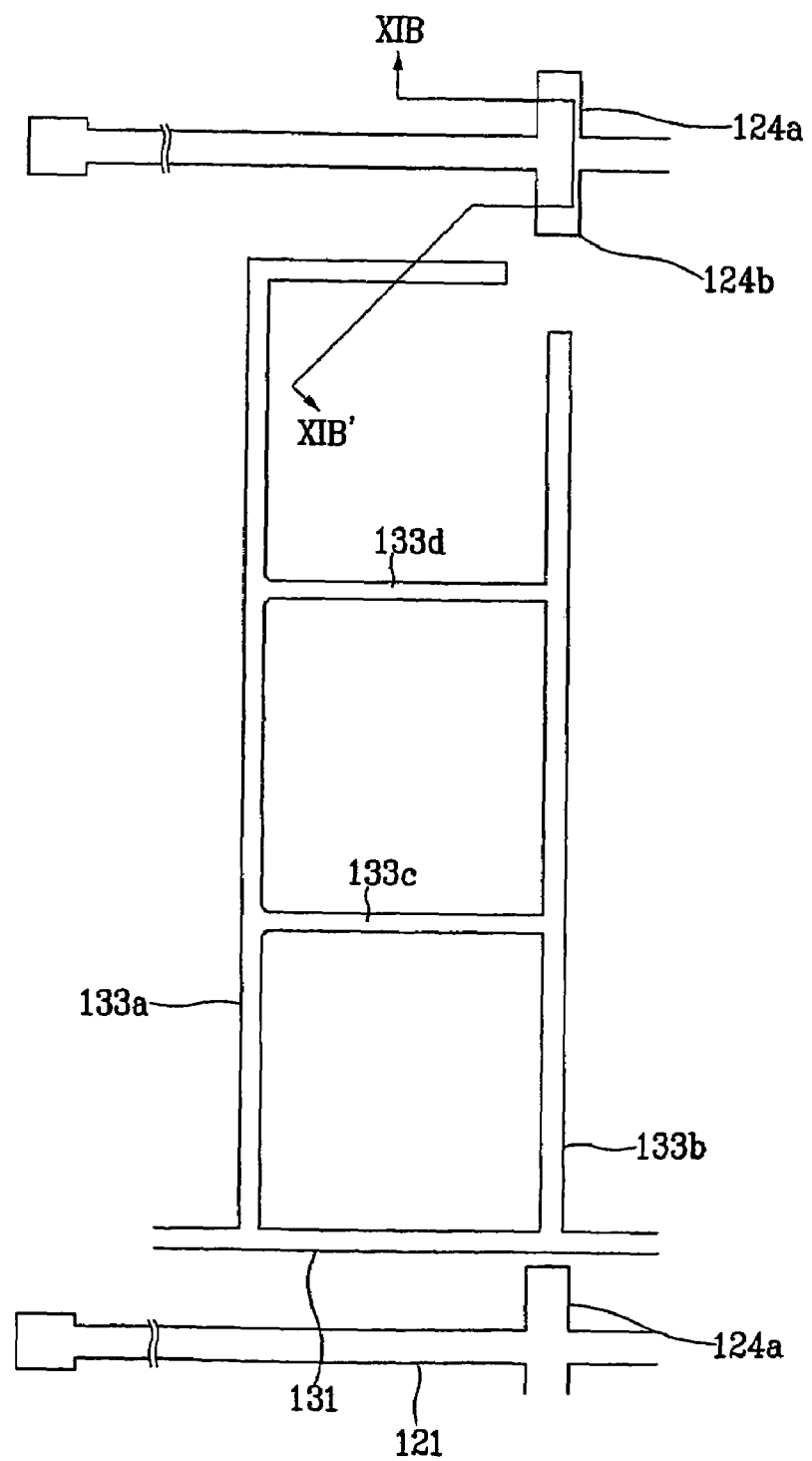
FIGS. 11A, 13A and 14A are layout views of a TFT array panel shown in FIGS. 10A and 10B sequentially illustrating a manufacturing method thereof according to an embodiment of the present invention.
Figure 12:
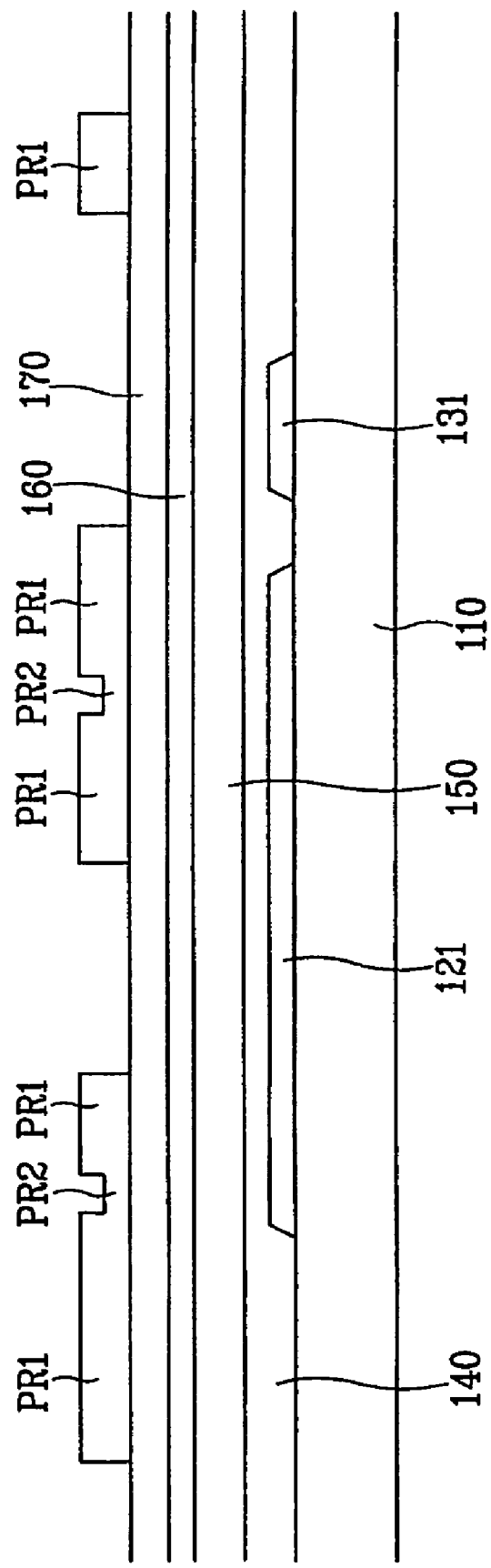
FIG. 12 is a sectional view of the TFT array panel in a step of the manufacturing method between FIG. 11B and FIG. 13B.
Figure 13A:
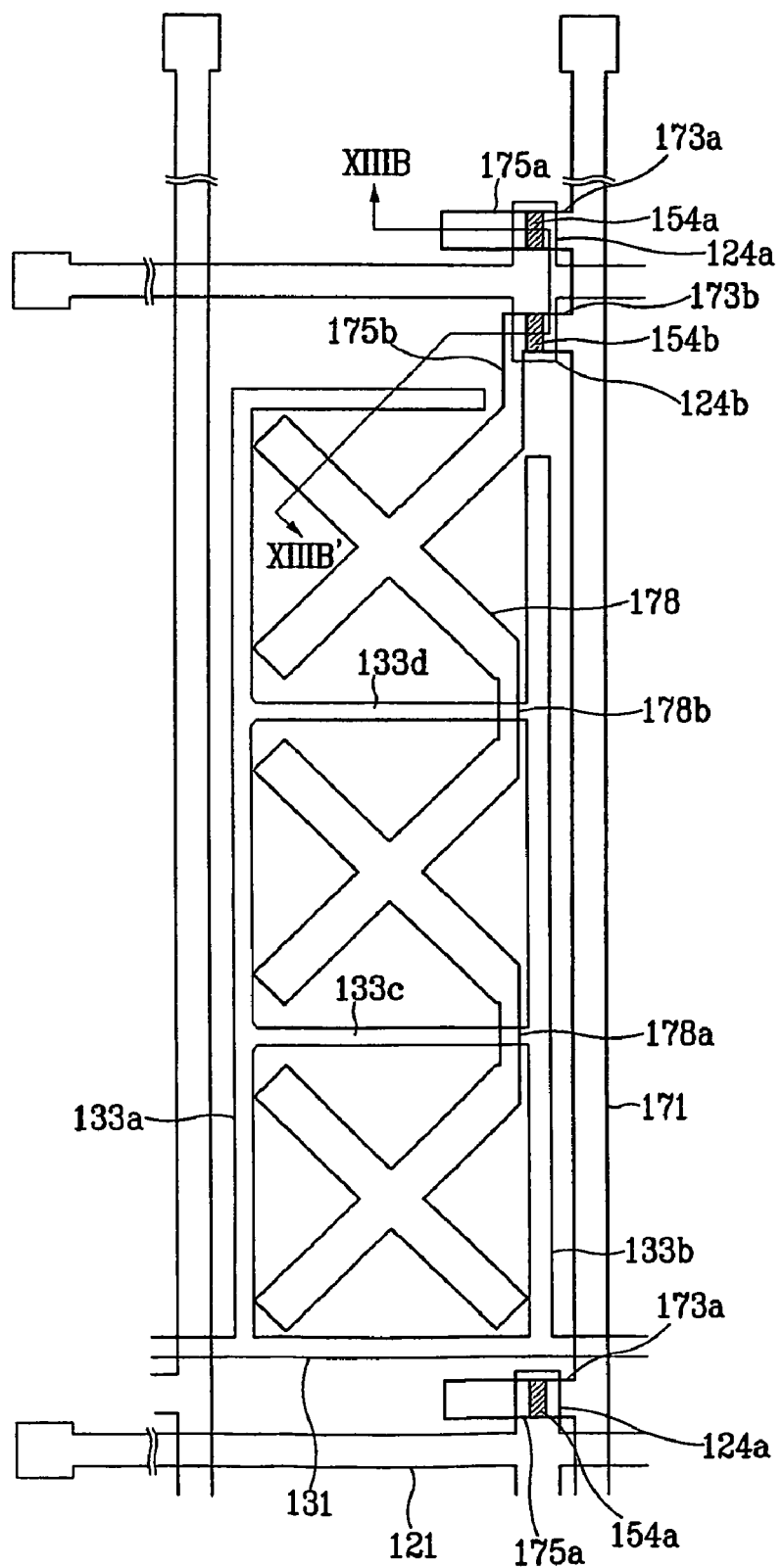
Figure 13B:
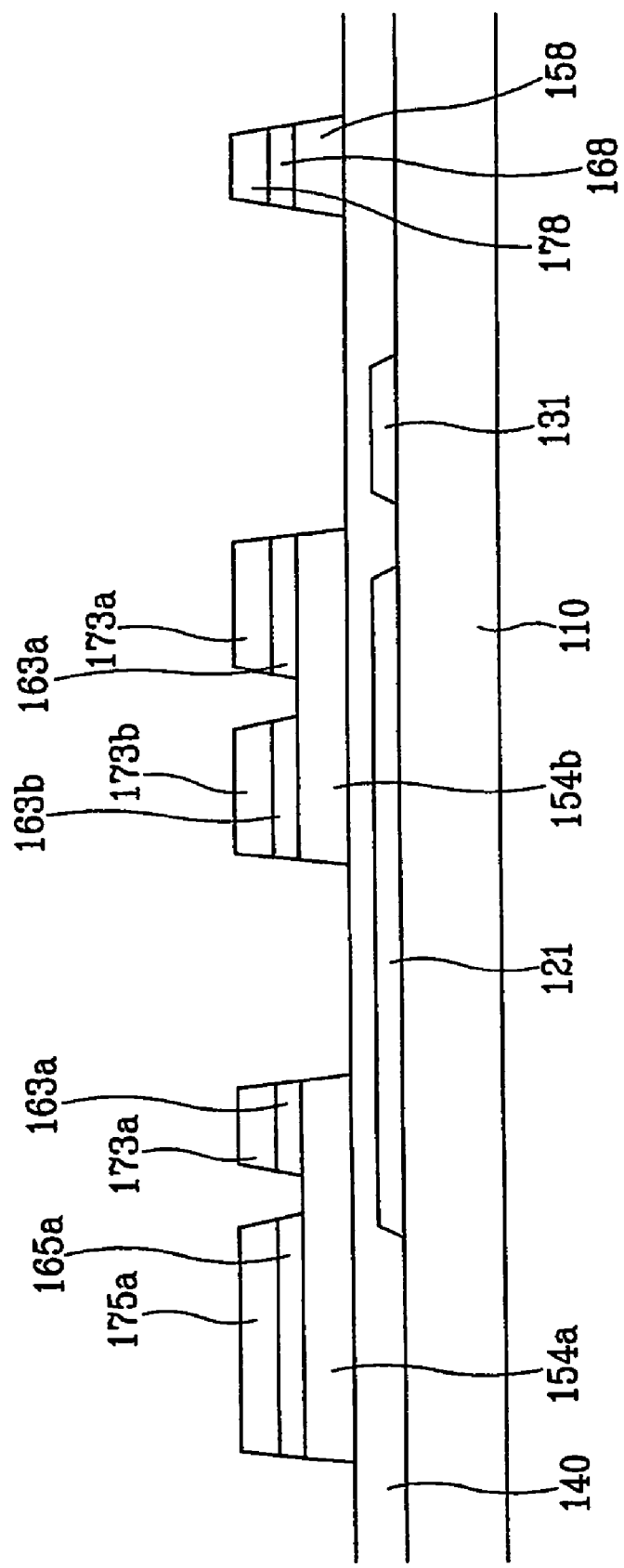
Figure 14A:
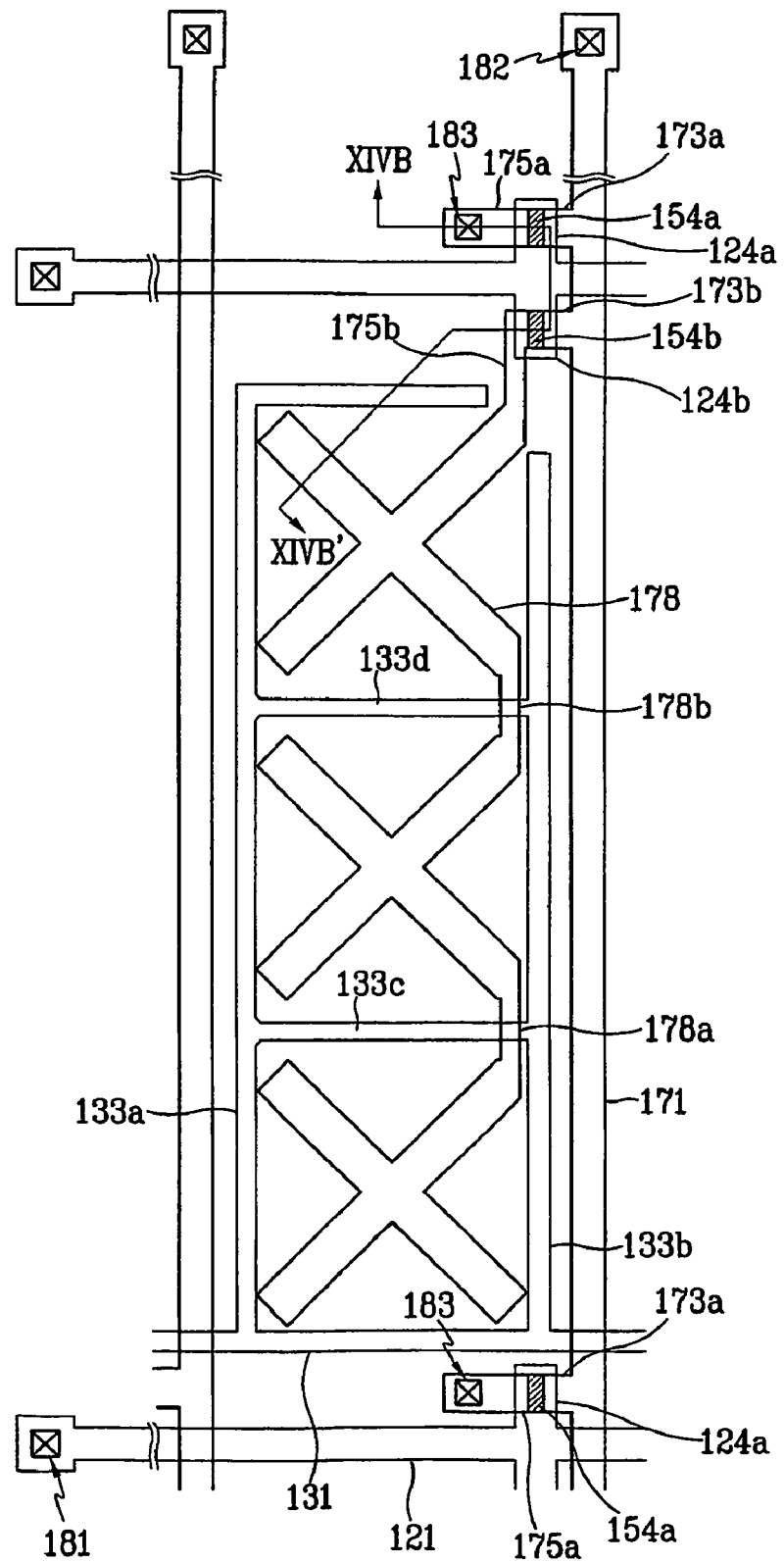
Figure 14B:
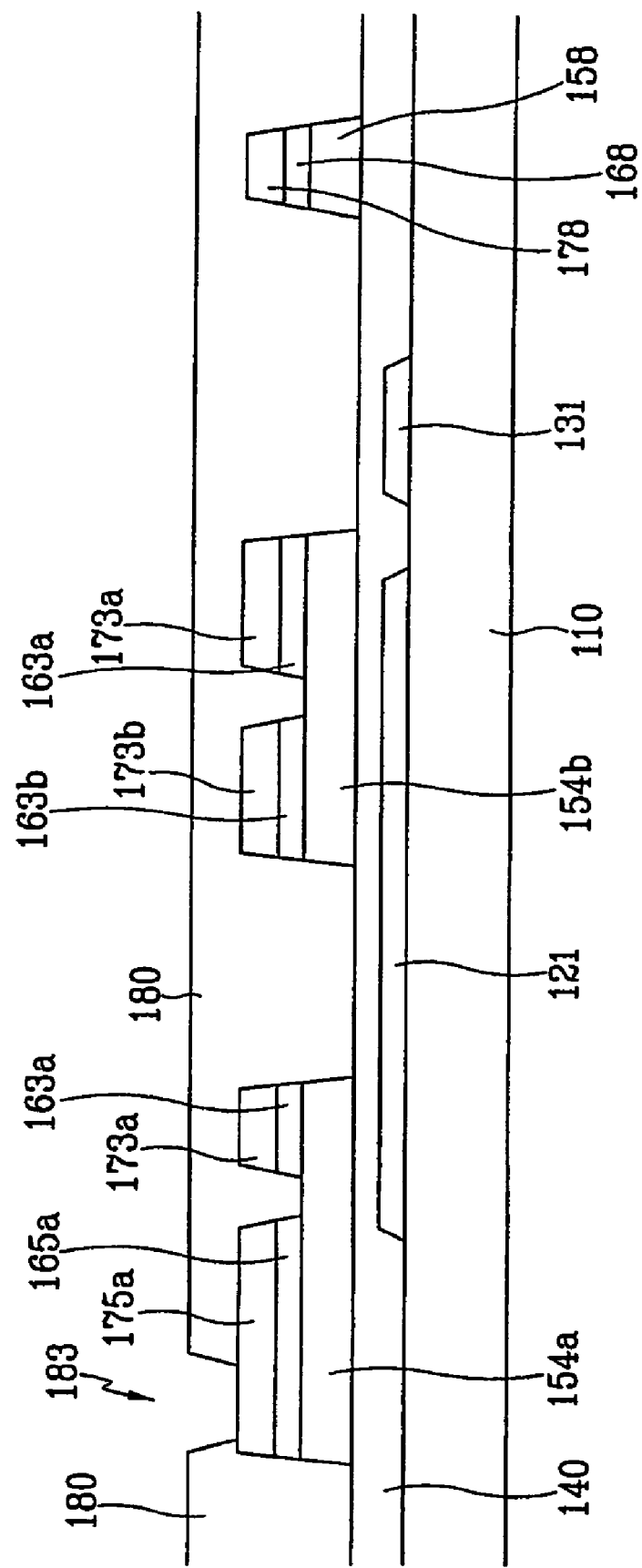

FIGS. 11A, 13A and 14A are layout views of a TFT array panel shown in FIGS. 10A and 10B sequentially illustrating a manufacturing method thereof according to an embodiment of the present invention. FIGS. 11B, 13B and 14B are sectional views of the TFT array panel shown in FIGS. 11A, 13A and 14A, respectively, and FIG. 12 is a sectional view of the TFT array panel in a step of the manufacturing method between FIG. 11B and FIG. 13B.

First, as shown in FIGS. 11A and 11B, Al, Ag, their alloys or the like is deposited and photo-etched to form a plurality of gate lines 121 and a plurality of storage electrodes 131.

As shown in FIG. 12, a silicon nitride layer 140, an a-Si layer 150, a doped a-Si layer 160, and a metal layer 170 preferably made of Al, Ag or their alloys are sequentially deposited by CVD and sputtering, and a photoresist film with thickness of about 1–2 microns is coated thereon. Thereafter, the photoresist film is exposed to light through a photo mask (not shown) and is developed as shown in FIG. 12. The photoresist film has position-dependent thickness and, for example, includes first to third portions having thickness decreasing in sequence. In FIG. 12, the first and the second portions are indicated by reference numerals PR1 and PR2, while there is no numeral indicating the third portion since the third portion is shown to have zero thickness and to expose the underlying conductive layer 170. The ratio of the thickness of the photoresist film PR1 and PR2 is adjusted depending on process conditions of subsequent process steps, and it is preferable that the thickness of the second portion is equal to or less than a half of that of the first portion, for example, equal to or less than 4,000 Å.

The position-dependent thickness of the photoresist film is obtained by several techniques, for example, by providing semi-transparent areas on the exposure mask as well as transparent areas and opaque areas. The semi-transparent areas alternatively have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. That is, once a photoresist pattern made of a reflowable material is formed by using a normal exposure mask only with transparent areas and opaque areas, it is subject to reflow process to flow onto areas without the photoresist, thereby forming thin portions.

The different thickness of the photoresist film PR1 and PR2 enables to selectively etch the underlying layers when using suitable process conditions. Therefore, a plurality of data lines 171, a plurality of drain electrodes 175a and 175b and a plurality of DCEs 178 as well as a plurality of ohmic contact stripes and islands 161, 165a and 165b and a plurality of semiconductor stripes 151 are obtained by a series of etching steps.

An exemplary sequence of forming the structure shown in FIGS. 13A and 13B is as follows:.

(1) Removal of portions of the conductive layer 170, the doped a-Si layer 160 and the a-Si layer 150 under the third portion of the photoresist film;

(2) Removal of the second portion PR2 of the photoresist film;

(3) Removal of portions of the conductive layer 170 and the doped a-Si layer 160 under the second portion PR2 of the photoresist film; and (4) Removal of the first portion PR1 of the photoresist film.

Another exemplary sequence is as follows:

(1) Removal of portions of the conductive layer 170 under the third portion of the photoresist film;

(2) Removal of the second portion PR2 of the photoresist film;

(3) Removal of portions of the doped a-Si layer 160 and the a-Si layer 150 under the third portion of the photoresist film;

(4) Removal of portions of the conductive layer 170 under the second portion PR2 of the photoresist film;

(5) Removal of the first portion PR1 of the photoresist film; and (6) Removal of the doped a-Si layer 160 under the second portion PR2 of the photoresist film Although the removal of the second portion PR2 of the photoresist film causes the thickness reduction of the first portion PR1 of the photoresist film, it does not remove the first portion PR1, which protects the underlying layers from removal or etching, since the thickness of the second portion PR2 is smaller than the first portion PR1.

By selecting an appropriate etching condition, the second portion PR2 of the photoresist film and the portions of the doped a-Si layer 160 and the a-Si layer 150 under the third portion of the photoresist film are simultaneously removed. Similarly, the removal of the first portion PR1 of the photoresist film and the removal of the portions of the doped a-Si layer 160 under the second portion PR2 of the photoresist film are simultaneously performed. For instance, the etched thicknesses of the photoresist film and the a-Si layer 150 (or the doped a-Si layer 160) are nearly the same when using a gas mixture of $SF_6$ and HCl, or a gas mixture of $SF_6$ and $O_2$.

Photoresist remnants left on the surface of the conductive layer 170, if any, are removed by ashing.

Examples of etching gases used for etching the doped a-Si layer 160 in the step (3) of the first example and in the step (4) of the second example are a gas mixture of $CF_4$ and HCl and a gas mixture of $CF_4$ and $O_2$. Use of the gas mixture of $CF_4$ and $O_2$ enables to obtain uniform thickness of etched portions of the semiconductor layer 150.

Subsequently, a passivation layer 180 is formed by growing a-Si:C:O or a-Si:O:F, by CVD of silicon nitride, or by coating an organic insulating material such as acryl-based material. When forming an a-Si:C:O layer, $SiH(CH_3)_3$, $SiO_2(CH_3)_4$, $(SiH)_4O_4(CH_3)_4$, $Si(C_2H_5O)_4$ or the like used as basic source, oxidant such as $N_2O$ or $O_2$, and Ar or He are mixed in gaseous states to flow for the deposition. For an s-Si:O:F layer, the deposition is performed by flowing a gas mixture including $SiH_4$, $SiF_4$ or the like and an additional gas of $O_2$. $CF_4$ may be added as a secondary source of fluorine. As shown in FIGS. 10A and 10B, the passivation layer 180 together with the gate insulating layer 140 is photo-etched to form a plurality of contact holes 181, 182 and 183.

Finally, an ITO layer or an IZO layer is deposited and photo-etched to form a plurality of pixel electrodes 190 and a plurality of contact assistants 91 and 92.

For the ITO layer, a Cr etchant such as $(HNO_3/(NH_4)_2Ce(NO_3)_6/H_2O)$ can be used as an etchant, which does not corrode the exposed portions of the gate lines 121, the data lines 171 and the drain electrodes 175a and 175b through the contact holes 181, 182 and 183. The IZO layer is deposited at temperature preferably in a range from a room temperature to 200° C. for minimizing the contact resistance at the contacts. A preferred example of a target for the IZO layer includes $In_2O_3$ and ZnO. The content of ZnO is preferably in a range between 15 atm % and 20 atm %.

Meanwhile, nitrogen gas, which prevents the formation of metal oxides on the exposed portions of the gate lines 121, the data lines 171 and the drain electrodes 175a and 175b through the contact holes 181, 182 and 183, is preferably used for the pre-heating process before the deposition of the ITO layer or the IZO layer.

An LCD according to another embodiment of the present invention is described in detail with reference to FIGS. 15A and 15B.

Figure 15A:
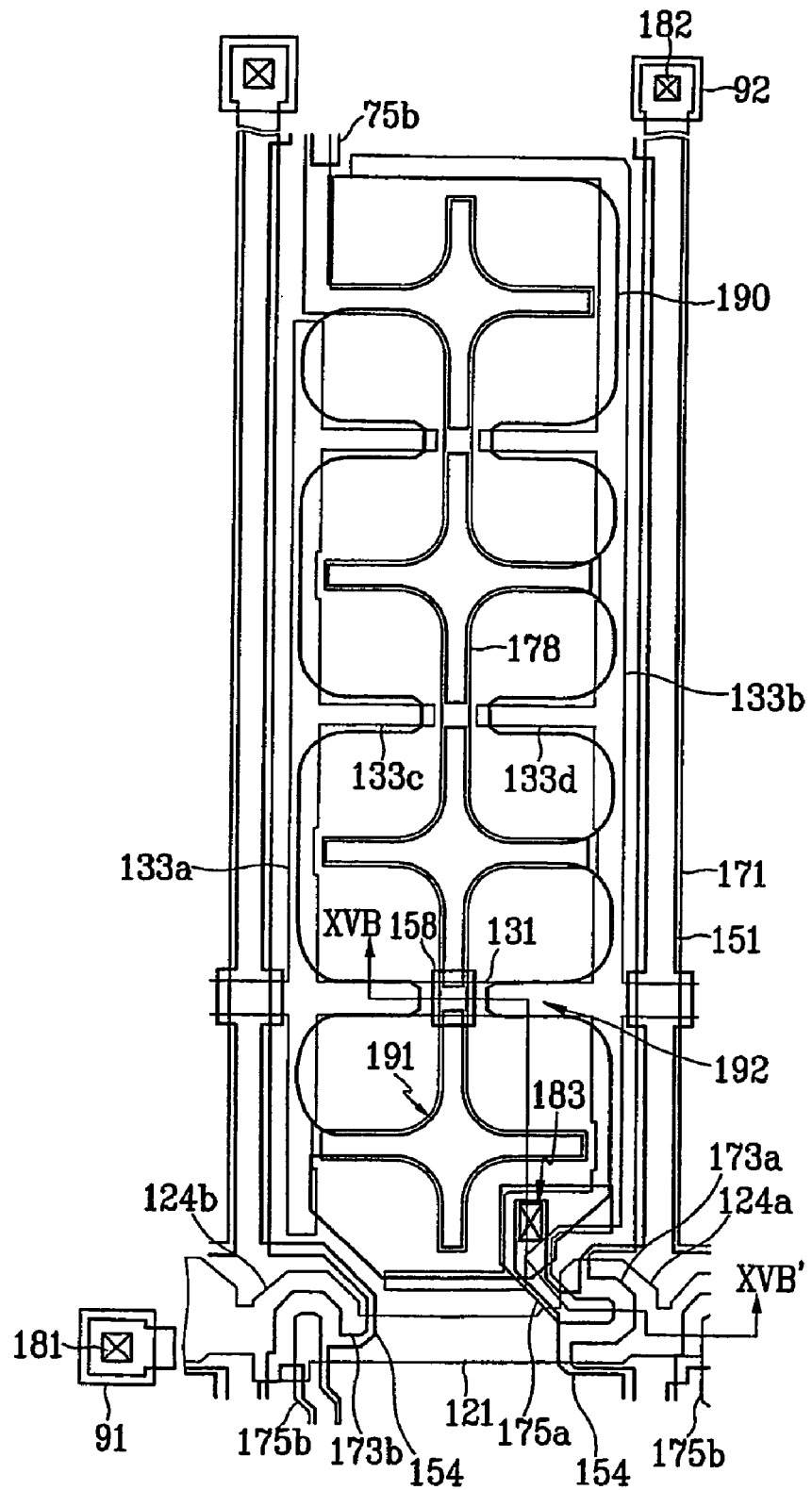
FIG. 15A is a layout view of an LCD according to another embodiment of the present invention.
Figure 15B:
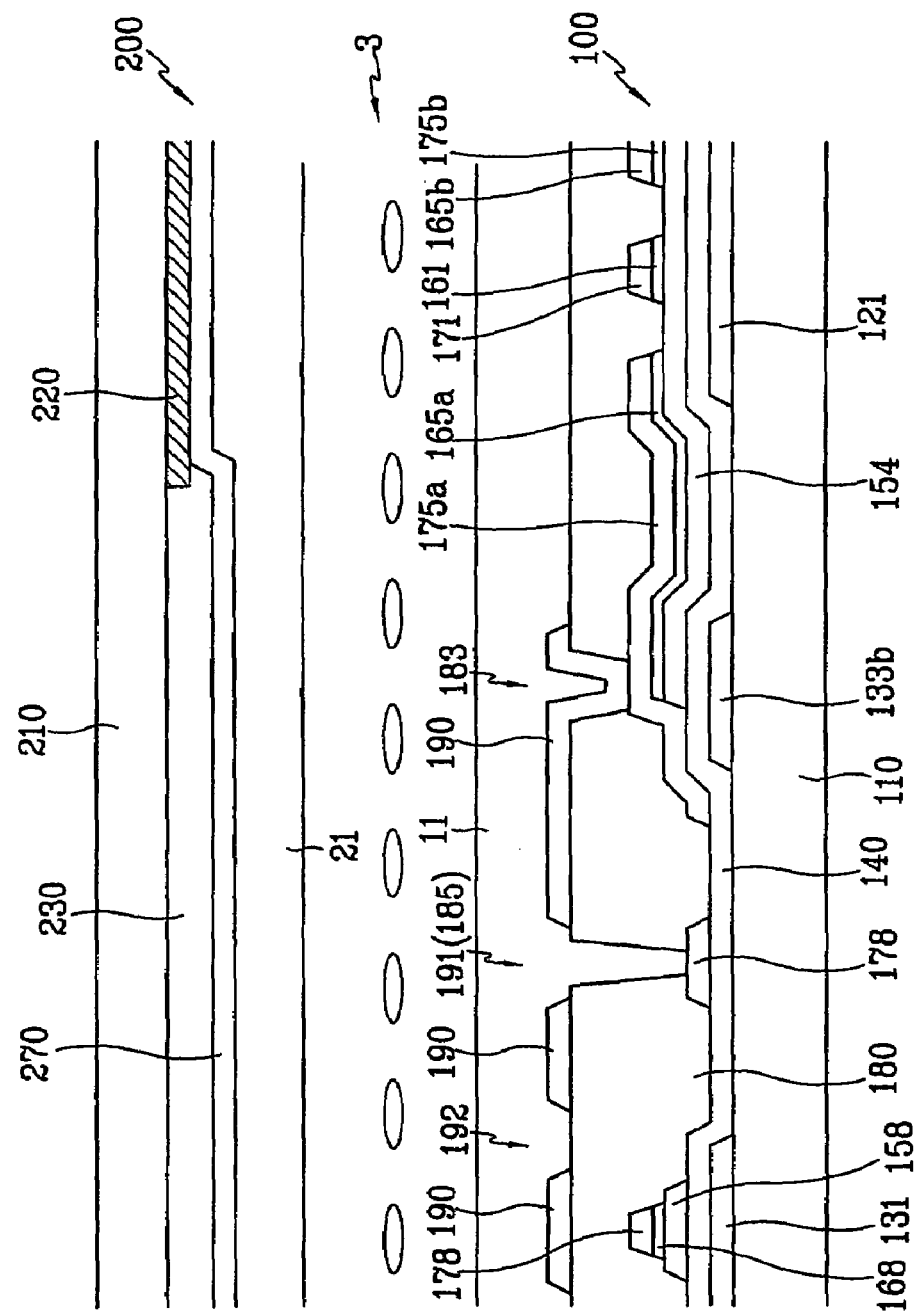
FIG. 15B is a sectional view of the LCD shown in FIG. 15A taken along the line XVB–XVB'.

FIG. 15A is a layout view of an LCD according to another embodiment of the present invention, and FIG. 15B is a sectional view of the LCD shown in FIG. 15A taken along the line XVB–XVB'.

An LCD according to this embodiment of the present invention also includes a lower panel 100, an upper panel 200 facing the lower panel 100, and a liquid crystal layer 3 interposed between the lower panel 100 and the upper panel 200 and including a plurality of liquid crystal molecules aligned parallel to the surfaces of the panels 100 and 200.

A plurality of gate lines 121 and a plurality of storage electrodes 131 extending substantially in a transverse direction are formed on an insulating substrate 110.

Each gate line includes a plurality of pairs of expansions forming first and second gate electrodes 124a and 124b.

Each storage electrode 131 includes a stem and a plurality of sets of first to fourth branches 133a–133d forming a ladder shape. The first branch 133a extends upwardly and downwardly from the stem in a longitudinal direction. The second branch 133b includes a major portion connected to the stem and extending upwardly and downwardly from the stem in a longitudinal direction and two subsidiary portions connected to both ends of the major portion and extending substantially in the transverse direction Two pairs of the third and the fourth branches 133c and 133d extend in the transverse direction from the first branch 133a and the second branch 133b, respectively, and approach each other.

A gate insulating layer 140 is formed on the gate lines 121 and the storage electrodes 131.

A plurality of semiconductor stripes 151 and a plurality of semiconductor islands 158 preferably made of a-Si are formed on the gate insulating layer 140. Each semiconductor stripe 151 extends in the longitudinal direction and located between the first branch 133a and the second branch 133b belonging to adjacent sets of the branches 133a–133d of the storage electrode 131. Each semiconductor stripe 151 includes a plurality of expansions 154 disposed near the gate electrodes 124a and 124b, which form channels of TFTs. The semiconductor islands 158 are located on the stems of the storage electrode 131.

A plurality of sets of an ohmic contact stripe 161 and a plurality of pairs of ohmic contact islands 165a and 165b preferably made of silicide or hydrogenated a-Si heavily doped with n type impurity are formed on the semiconductor stripes 151. A plurality of ohmic contact islands 168 are also formed on the semiconductor islands 158.

A plurality of sets of a data line 171 and a plurality of pairs of first and second drain electrodes 175a and 175b are formed on the ohmic contact stripes 161, the ohmic contact islands 165a and 165b, and the gate insulating layer 140. Each data line 171 includes a plurality of sets of pairs of expansions forming first and second source electrodes 173a and 173b and located opposite the first and the second drain electrodes 175a and 175b with respect to the first and the second gate electrodes 124a and 124b, respectively.

A plurality of DCEs 178 are formed on the gate insulating layer 140 and the ohmic contact islands 168. Each DCE 178 includes a plurality of crosses located in areas surrounded by the storage electrode 131. The crosses of the DCE 178 are connected in the gaps between the third and the fourth branches of the storage electrode 131, and one of the X-shaped pieces is connected to the second drain electrode 175b. The DCE intersects the stem of the storage electrode 131, and the semiconductor islands 158 and the ohmic contact islands 168 thereon ensure the insulation between the DCE 178 and the storage electrode 131.

The ohmic contact stripes and islands 161, 165a, 165b and 168 are interposed only between the semiconductor stripes and islands 151 and 158 and the data lines 171, the drain electrodes 175a and 175b, and the DCEs 178 to reduce the contact resistance therebetween, and thus some portions of the semiconductor stripes and islands 151 and 158 are exposed out of the data lines 171, the drain electrodes 175a and 175b, and the DCEs 178.

The first gate electrode 124a, the first source electrode 173a and the first drain electrode 175a along with a portion of the semiconductor stripe 161 located between the first source electrode 173a and the first drain electrode 175a form a TFT for controlling a voltage to be applied to the pixel electrode 190, while the second gate electrode 124b, the second source electrode 173b and the second drain electrode 175b along with a portion of the semiconductor stripe 161 located between the second source electrode 173b and the second drain electrode 175b form a TFT for controlling a voltage to be applied to the DCE 178.

A passivation layer 180 preferably made of silicon nitride or organic insulator is formed on the data lines 171, the drain electrodes 175a and 175b and the DCEs 178 and the exposed portions of the semiconductor stripes and islands 151 and 158.

The passivation layer 180 is provided with a plurality of contact holes 183 exposing the first drain electrodes 175a and a plurality of contact holes 182 exposing end portions of the data lines 171. The gate insulating layer 140 and the passivation layer 180 are provided with a plurality of contact holes 181 exposing end portions of the gate lines 121. The passivation layer 180 has a plurality of trenches 185 exposing the DCEs 178, which contribute to the formation of stable domains by affecting the tilt directions of the liquid crystal molecules.

A plurality of pixel electrodes 190 and a plurality of contact assistants 91 and 92 are formed on the passivation layer 180.

Each pixel electrode 190 is connected to the first drain electrode 175a through the contact hole 183 and has a plurality of cross-shaped cutouts 191 and a plurality of linear cutouts 192. The cross-shaped cutouts 191 overlap the crosses of the DCE 178 to expose trenches 185 of the passivation layer 180 while the linear cutouts 192 overlap the storage electrode 131. Each pixel electrode 190 overlaps the DCE 178, which is connected to a previous gate line 121 and a previous data line 171 through a TFT, to form a DCE capacitor CD while the pixel electrode 190 also overlaps the storage electrode 131 to form a storage capacitor $C_{ST}$.

An alignment layer 11 is coated on entire surface of the upper panel 100 except for areas provided with the contact assistants 91 and 92.

The upper panel 210 will now be described in detail A black matrix 220, a plurality of red, green and blue color filters 230, and a common electrode 270 are formed on an upper substrate 210. An overcoat (not shown) may be provided on or under the common electrode 270, and an alignment layer 21 is coated on the common electrode 270.

The liquid crystal layer 3 has positive dielectric anisotropy and homogeneous alignment, where a plurality of liquid crystal molecules contained in the liquid crystal layer 3 are aligned such that their major axes are substantially parallel to the lower and the upper panels 100 and 200 in absence of electric field. The liquid crystal molecules preferably have twisted structure from the lower panel 100 to the upper panel 200.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A thin film transistor array panel comprising:
an insulating substrate;
a plurality of control lines provided on the substrate and including first and second control lines;
a plurality of data lines provided on the substrate and including first and second data lines;
a pixel electrode provided on the substrate and having a cutout;
a field control electrode provided on the substrate and overlapping the cutout;
a first switching element for applying a first signal from the first data line to the pixel electrode in response to a first control signal from the first control line; and
a second switching element for controlling a second signal to be applied to the field control electrode.

2. The thin film transistor array panel of claim 1, wherein the first and the second switching elements are active at different times.

3. The thin film transistor array panel of claim 2, wherein the second switching element is active before the first switching element.

4. The thin film transistor array panel of claim 3, wherein the first switching element becomes active immediately after the activation of the first switching element.

5. The thin film transistor array panel of claim 3, wherein the second signal is supplied from one of the data lines and the second switching element applies the second signal to the field control electrode in response to a second control signal from the second control line.

6. The thin film transistor array panel of claim 5, wherein the second signal is supplied from the first data line.

7. The thin film transistor array panel of claim 5, wherein the second signal is supplied from the second data line, and the second data line is adjacent to the first data line.

8. The thin film transistor array panel of claim 1, wherein the field control electrode overlaps the pixel electrode.

9. The thin film transistor array panel of claim 1, wherein the field control electrode and the control lines include substantially the same layer.

10. The thin film transistor array panel of claim 1, wherein the field control electrode and the data lines include substantially the same layer.

11. The thin film transistor array panel of claim 1, further comprising an insulating layer interposed between the field control electrode and the pixel electrode and having a trench overlapping the cutout.

12. The thin film transistor array panel of claim 1, further comprising a semiconductor layer located under the data lines.

13. A liquid crystal display comprising:
a first panel including a plurality of control lines including first and second control lines, a plurality of data lines including first and second data lines, a pixel electrode having a cutout, a field control electrode overlapping the cutout, a first switching element electrically connected to the first control line, the first data line and the pixel electrode, and an insulating layer interposed between the field control electrode and the pixel electrode;
a second panel opposite the first panel and including a common electrode; and
a liquid crystal layer interposed between the first and the second panels,
wherein $$V_{DCE} > V_p \times \left(1 + \frac{\varepsilon d'}{\varepsilon' d}\right)$$

for positive $V_p$ and $$V_{DCE} < V_p \times \left(1 + \frac{\varepsilon d'}{\varepsilon' d}\right)$$

for negative $V_p$ where $V_{DCE}$ is a voltage of the field control electrode with respect to the common electrode, $V_p$ is a voltage of the pixel electrode with respect to the common electrode, $\varepsilon$ and d are permittivity and thickness of the liquid crystal layer, respectively, and $\varepsilon'$ and d' are permittivity and thickness of the insulating layer.

14. The liquid crystal display of claim 13, further comprising a second switching element for controlling a signal to be applied to the field control electrode.

15. The liquid crystal display of claim 14, wherein the first and the second switching elements are active at different times.

16. The liquid crystal display of claim 15, wherein the second switching element is active before the first switching element.

17. The liquid crystal display of claim 16, wherein the first switching element becomes active immediately after the activation of the first switching element.

18. The liquid crystal display of claim 16, wherein the second switching element is connected to the second control line, one of the data lines, and the field control electrode.

19. A liquid crystal display comprising:
a first panel including a plurality of control lines including first and second control lines, a plurality of data lines including first and second data lines, a pixel electrode having a cutout, a field control electrode overlapping the cutout, a first switching element electrically connected to the first control line, the first data line and the pixel electrode, and an insulating layer interposed between the field control electrode and the pixel electrode;
a second panel opposite the first panel and including a common electrode; and
a liquid crystal layer interposed between the first and the second panels,
wherein $$\frac{C_{LC}}{2C_{DCE}+C_{LC}} > \frac{\varepsilon d'}{\varepsilon' d}$$

where $C_{LC}$ is a capacitance between the pixel electrode and the common electrode, $C_{DCE}$ is a capacitance between the pixel electrode and the field control electrode, $\varepsilon$ and d are permittivity and thickness of the liquid crystal layer, respectively, and $\varepsilon'$ and d' are permittivity and thickness of the insulating layer.

20. The liquid crystal display of claim 19, further comprising a second switching element for controlling a signal to be applied to the field control electrode.

21. The liquid crystal display of claim 20, wherein the first and the second switching elements are active at different times.

22. The liquid crystal display of claim 21, wherein the second switching element is active before the first switching element.

23. The liquid crystal display of claim 22, wherein the first switching element becomes active immediately after the activation of the first switching element.

24. The liquid crystal display of claim 22, wherein the second switching element is connected to the second control line, one of the data lines, and the field control electrode.

25. The liquid crystal display of claim 24, wherein the pixel electrode and the field control electrode are supplied with signals having the same polarity with respect to a voltage of the common electrode for a sequence of activation of the second switching element and the first switching element.

26. A liquid crystal display comprising:
a first panel including a plurality of control lines including first and second control lines, a plurality of data lines including first and second data lines, a pixel electrode having a cutout, a field control electrode overlapping the cutout, a first switching element for applying a first signal from the first data line to the pixel electrode in response to a first control signal from the first control line, and a second switching element for controlling a second signal to be applied to the field control electrode;
a second panel opposite the first panel and including a common electrode; and
a liquid crystal layer interposed between the first and the second panels,
wherein the second switching element is active before the first switching element in a sequence of activations of the second switching element and the first switching element and the first and the second signals have the same polarity with respect to a voltage of the common electrode for the sequence of activation.

27. The liquid crystal display of claim 26, wherein the first switching element becomes active immediately after the activation of the first switching element.

* * * * *